United States Patent
Ji et al.

(10) Patent No.: US 10,404,332 B2
(45) Date of Patent: Sep. 3, 2019

(54) DOWNLINK COMMON BURST CHANNELIZATION

(71) Applicant: QUALCOMM Incorporated, San Diego, CA (US)

(72) Inventors: Tingfang Ji, San Diego, CA (US); John Edward Smee, San Diego, CA (US); Joseph Binamira Soriaga, San Diego, CA (US); Wei Zeng, San Diego, CA (US); Jing Jiang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 438 days.

(21) Appl. No.: 15/182,433

(22) Filed: Jun. 14, 2016

(65) Prior Publication Data

US 2017/0222696 A1 Aug. 3, 2017

Related U.S. Application Data

(60) Provisional application No. 62/288,374, filed on Jan. 28, 2016.

(51) Int. Cl.
*H04W 4/00* (2018.01)
*H04B 7/0417* (2017.01)
(Continued)

(52) U.S. Cl.
CPC ......... *H04B 7/0417* (2013.01); *H04L 5/0048* (2013.01); *H04L 5/0051* (2013.01);
(Continued)

(58) Field of Classification Search
None
See application file for complete search history.

(56) References Cited

U.S. PATENT DOCUMENTS

2009/0092085 A1\* 4/2009 Ramesh ............... H04L 1/0083
370/329
2009/0312073 A1\* 12/2009 Park .................. H04W 52/0216
455/574

(Continued)

FOREIGN PATENT DOCUMENTS

WO   WO-2016148877 A1   9/2016
WO   WO-2016148878 A1   9/2016

OTHER PUBLICATIONS

Ericsson: "5G-Key Component of the Networked Society", Sep. 17, 2015 (Sep. 17, 2015), XP055359562, pp. 1-55. Retrieved from the Internet: URL: http://portal.3gpp.org/ngppapp/CreateTdoc.aspx?mode=view&contributionId=652697.

(Continued)

*Primary Examiner* — Bob A Phunkulh
(74) *Attorney, Agent, or Firm* — Linda G. Gunderson; Loza & Loza LLP

(57) ABSTRACT

Techniques for utilizing resources in a downlink (DL) common burst are described herein. In one aspect, a channel state information reference signal (CSI-RS) may be included in the DL common burst for channel estimation. In another aspect, a demodulation reference signal (DM-RS) and DL data may be included in the DL common burst for low latency data transmission. In yet another aspect, a measurement reference signal (M-RS) may be included in the DL common burst to assist handover decisions. The techniques described herein may be used for various wireless communications systems.

68 Claims, 13 Drawing Sheets

(51) Int. Cl.
  *H04L 5/00* (2006.01)
  *H04W 72/04* (2009.01)
  *H04L 25/02* (2006.01)
  *H04W 28/02* (2009.01)

(52) U.S. Cl.
  CPC ........ *H04L 5/0055* (2013.01); *H04L 25/0224* (2013.01); *H04W 72/042* (2013.01); *H04W 28/0236* (2013.01)

(56) References Cited

U.S. PATENT DOCUMENTS

| | | | | |
|---|---|---|---|---|
| 2011/0002288 | A1* | 1/2011 | Lee | H04L 5/0007 370/329 |
| 2011/0002320 | A1* | 1/2011 | Yuk | H04W 48/08 370/338 |
| 2011/0026419 | A1* | 2/2011 | Kim | H04W 52/281 370/252 |
| 2012/0028628 | A1* | 2/2012 | Frenger | H04B 7/0417 455/422.1 |
| 2013/0039347 | A1* | 2/2013 | Moqvist | H04W 72/1268 370/335 |
| 2013/0077704 | A1* | 3/2013 | Ding | H04L 25/03898 375/267 |
| 2013/0114494 | A1* | 5/2013 | Yuk | H04W 72/04 370/312 |
| 2013/0148515 | A1 | 6/2013 | Ribeiro et al. | |
| 2013/0242778 | A1* | 9/2013 | Geirhofer | H04L 1/0026 370/252 |
| 2013/0286881 | A1* | 10/2013 | Ding | H04W 8/24 370/252 |
| 2014/0269459 | A1* | 9/2014 | Fan | H04W 74/02 370/294 |
| 2014/0341051 | A1* | 11/2014 | Gaal | H04W 24/10 370/252 |
| 2015/0334734 | A1* | 11/2015 | Park | H04W 76/15 370/329 |
| 2016/0006487 | A1* | 1/2016 | Ding | H04B 7/024 370/329 |
| 2016/0095077 | A1* | 3/2016 | Kwak | H04J 11/0093 370/280 |
| 2016/0135181 | A1* | 5/2016 | Nogami | H04W 24/08 370/329 |
| 2016/0173244 | A1* | 6/2016 | Ding | H04L 5/0023 370/329 |
| 2016/0381587 | A1* | 12/2016 | Alexey | H04W 76/38 370/329 |
| 2018/0176000 | A1* | 6/2018 | Lee | H04L 1/1822 |

OTHER PUBLICATIONS

Ericsson: "Downlink Control Signaling", 3GPP Draft, R1-062866, 3rd Generation Partnership Project (3gpp), Mobile Competence Centre, 650, Route Des Lucioles, F-06921 Sophia-Antipolis Cedex, France, vol. RAN WG1, no. Seoul, Korea, Oct. 4, 2006, Oct. 4, 2006 (Oct. 4, 2006), XP050103351.

International Search Report and Written Opinion—PCT/US2017/014439—ISA/EPO—dated Apr. 6, 2017.

Qualcomm Incorporated: "Candidate Frame Structures", 3GPP Draft, R1-162207, Frame Structure Candidates, 3rd Generation Partnership Project (3gpp), Mobile Competence Centre, 650, Route Des Lucioles, F-06921 Sophia-Antipolis Cedex, France, vol. RAN WG1, no. Busan, Korea, Apr. 11, 2016-Apr. 15, 2016, Apr. 2, 2016 (Apr. 2, 2016), XP051080035, Retrieved from the Internet: URL: http://www.3gpp.org/ftp/tsg_ran/WG1_RL1/TSGR1_84b/Docs/.

Qualcomm Incorporated: "CSI Feedback Schemes", 3GPP Draft, R1-166382, 3rd Generation Partnership Project (3gpp), Mobile Competence Centre, 650, Route Des Lucioles, F-06921 Sophia-Antipolis Cedex, France, vol. RAN WG1, no. Gothenburg, Sweden, Aug. 22, 2016-Aug. 26, 2016, Aug. 13, 2016 (Aug. 13, 2016), XP051142365, 5 pages. Retrieved from the Internet: URL: http://www.3gpp.org/ftp/tsg_ran/WG1_RL1/TSGR1 86/Docs/.

* cited by examiner

DOWNLINK COMMON BURST CHANNELIZATION

RELATED APPLICATION

This application claims priority under 35 U.S.C. § 119(e) to U.S. Provisional Application No. 62/288,374 filed on Jan. 28, 2016, the entire specification of which is incorporated herein by reference.

BACKGROUND

Field

Aspects of the present disclosure relate generally to wireless communication systems, and more particularly, to subframe structures for wireless communication.

Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of mobile stations. A mobile station may communicate with a base station via the downlink and uplink. The downlink (or forward link) refers to the communication link from the base station to the mobile station, and the uplink (or reverse link) refers to the communication link from the mobile station to the base station.

SUMMARY

Techniques for utilizing resources in a downlink (DL) common burst are described herein. In one aspect, a channel state information reference signal (CSI-RS) may be included in the DL common burst for channel estimation. In another aspect, a demodulation reference signal (DM-RS) and DL data may be included in the DL common burst for low latency data transmission. In yet another aspect, a measurement reference signal (M-RS) may be included in the DL common burst to assist handover decisions. The techniques described herein may be used for various wireless communications systems.

In a first aspect, an apparatus for wireless communication is provided. The apparatus comprises a memory, and a processor operably coupled to the memory. The processor is configured to receive, at a mobile station, a channel state information reference signal (CSI-RS) in a downlink (DL) common burst of an uplink (UL) centric subframe, estimate a channel between a base station and the mobile station using the received CSI-RS, generate channel state feedback (CSF) information based on the estimated channel, and transmit the CSF to the base station.

In a second aspect, an apparatus for wireless communication is provided. The apparatus comprises a memory, and a processor operably coupled to the memory. The processor is configured to transmit, at a base station, a channel state information reference signal (CSI-RS) in a downlink (DL) common burst of an uplink (UL) centric subframe, and receive, from a mobile station, channel state feedback (CSF) information in response to the CS-RS, wherein the CSF is generated at the mobile station using the CSI-RS.

In a third aspect, an apparatus for wireless communication is provided. The apparatus comprises a memory, and a processor operably coupled to the memory. The processor is configured to receive, at a mobile station, a channel state information reference signal (CSI-RS) in a downlink (DL) common burst of a DL centric subframe, estimate a channel between a base station and the mobile station using the received CSI-RS, generate channel state feedback (CSF) information based on the estimated channel, and transmit the CSF information to the base station.

In a fourth aspect, an apparatus for wireless communication is provided. The apparatus comprises a memory, and a processor operably coupled to the memory. The processor is configured to transmit, at a base station, a channel state information reference signal (CSI-RS) in a downlink (DL) common burst of a DL centric subframe, and receive, from a mobile station, channel state feedback (CSF) information in response to the CS-RS, wherein the CSF is generated at the mobile station using the CSI-RS.

Various aspects and features of the disclosure are described in further detail below.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies.

Figure 1:
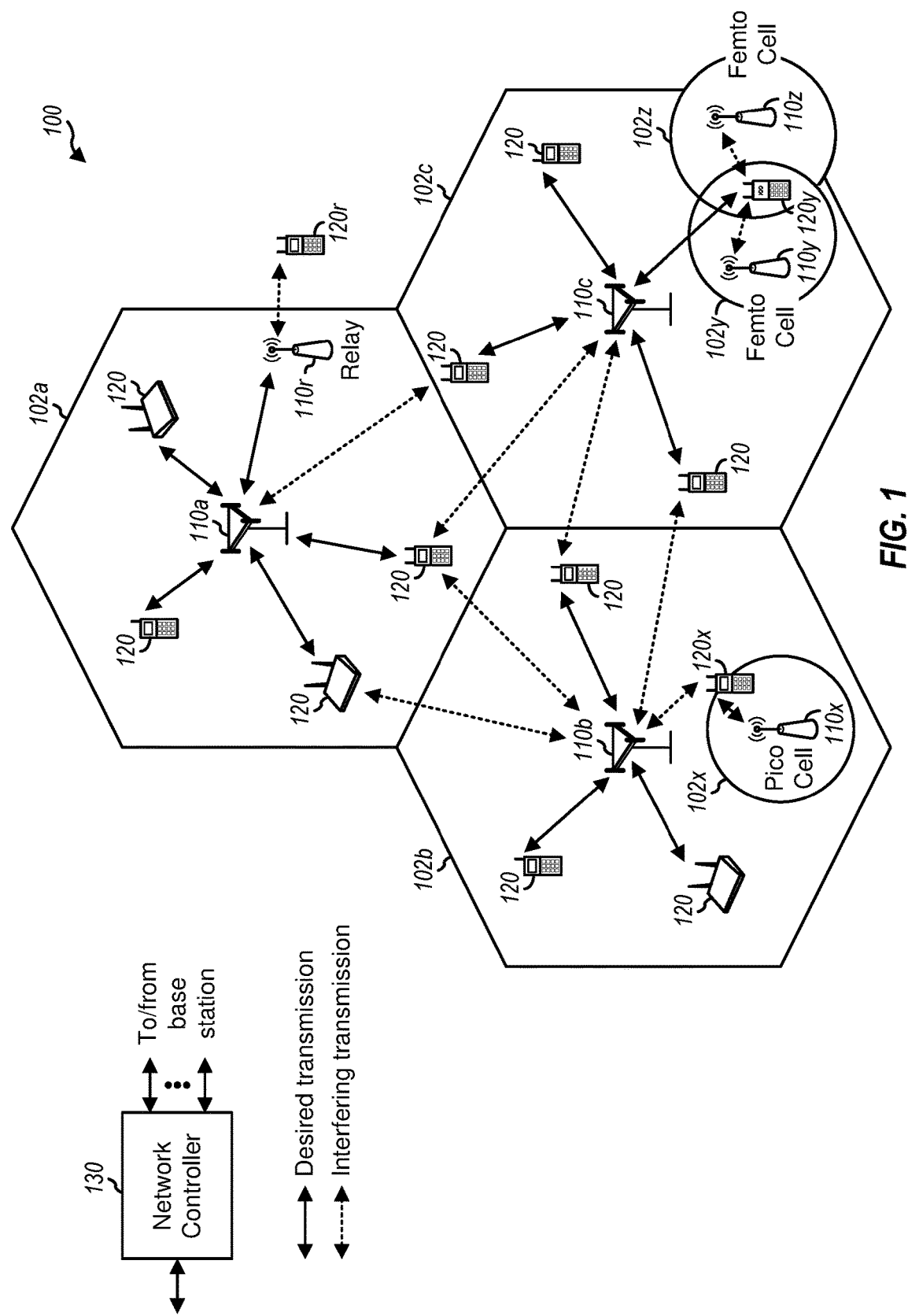
FIG. 1 is a block diagram conceptually illustrating an example of a telecommunications system.

FIG. 1 shows an example of a wireless communication network 100. The wireless network 100 may include a number of base stations 110 and other network entities. A base station may be a station that communicates with the mobile stations and may also be referred to as an access point, an evolved Node B (eNodeB), etc.

Each base station 110 may provide communication coverage for a particular geographic area. In 3GPP, the term "cell" can refer to a coverage area of a base station and/or a base station subsystem serving this coverage area, depending on the context in which the term is used.

A base station may provide communication coverage for a macro cell, a pico cell, a femto cell, and/or other types of cell. A macro cell may cover a relatively large geographic area (e.g., several kilometers in radius) and may allow unrestricted access by mobile stations with service subscription. A pico cell may cover a relatively small geographic area and may allow unrestricted access by mobile stations with service subscription. A femto cell may cover a relatively small geographic area (e.g., a home) and may allow restricted access by mobile stations having association with the femto cell (e.g., mobile stations in a Closed Subscriber Group (CSG), mobile stations for users in the home, etc.). A base station for a macro cell may be referred to as a macro base station. A base station for a pico cell may be referred to as a pico base station. A base station for a femto cell may be referred to as a femto base station or a home base station. In the example shown in FIG. 1, the base stations 110a, 110b and 110c may be macro base stations for the macro cells 102a, 102b and 102c, respectively. The base station 110x may be a pico base station for a pico cell 102x. The base stations 110y and 110z may be femto base stations for the femto cells 102y and 102z, respectively. A base station may support one or multiple (e.g., three) cells.

The wireless network 100 may also include relay stations. A relay station is a station that receives a transmission of data and/or other information from an upstream station (e.g., a base station or a mobile station) and sends a transmission of the data and/or other information to a downstream station (e.g., a mobile station or a base station). A relay station may also be a mobile station that relays transmissions for other mobile stations. In the example shown in FIG. 1, a relay station 110r may communicate with the base station 110a and a mobile station 120r in order to facilitate communication between the base station 110a and the mobile station 120r. A relay station may also be referred to as a relay base station, a relay, etc.

The wireless network 100 may be a heterogeneous network that includes base stations of different types, e.g., macro base stations, pico base stations, femto base stations, relays, etc. These different types of base stations may have different transmit power levels, different coverage areas, and different impact on interference in the wireless network 100. For example, macro base stations may have a high transmit power level (e.g., 20 Watts) whereas pico base stations, femto base stations and relays may have a lower transmit power level (e.g., 1 Watt).

The wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for both synchronous and asynchronous operation.

A network controller 130 may couple to a set of base stations and provide coordination and control for these base stations. The network controller 130 may communicate with the base stations 110 via a backhaul. The base stations 110 may also communicate with one another, e.g., directly or indirectly via wireless or wireline backhaul.

The mobile stations 120 (e.g., 120x, 120y, etc.) may be dispersed throughout the wireless network 100. A mobile station may also be referred to as a terminal, user equipment (UE), a subscriber unit, a station, etc. A mobile station may be a cellular phone, a personal digital assistant (PDA), a wireless modem, a wireless communication device, a handheld device, a laptop computer, a cordless phone, a wireless local loop (WLL) station, a tablet, a netbook, a smart book, etc. A mobile station may be able to communicate with macro base stations, pico base stations, femto base stations, relays, etc. In FIG. 1, a solid line with double arrows indicates desired transmissions between a mobile station and a serving base station, which is a base station designated to serve the mobile station on the downlink and/or uplink. A dashed line with double arrows indicates interfering transmissions between a mobile station and a base station.

The network may utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively. It is to be appreciated that the network is not limited to the above examples.

Figure 2:
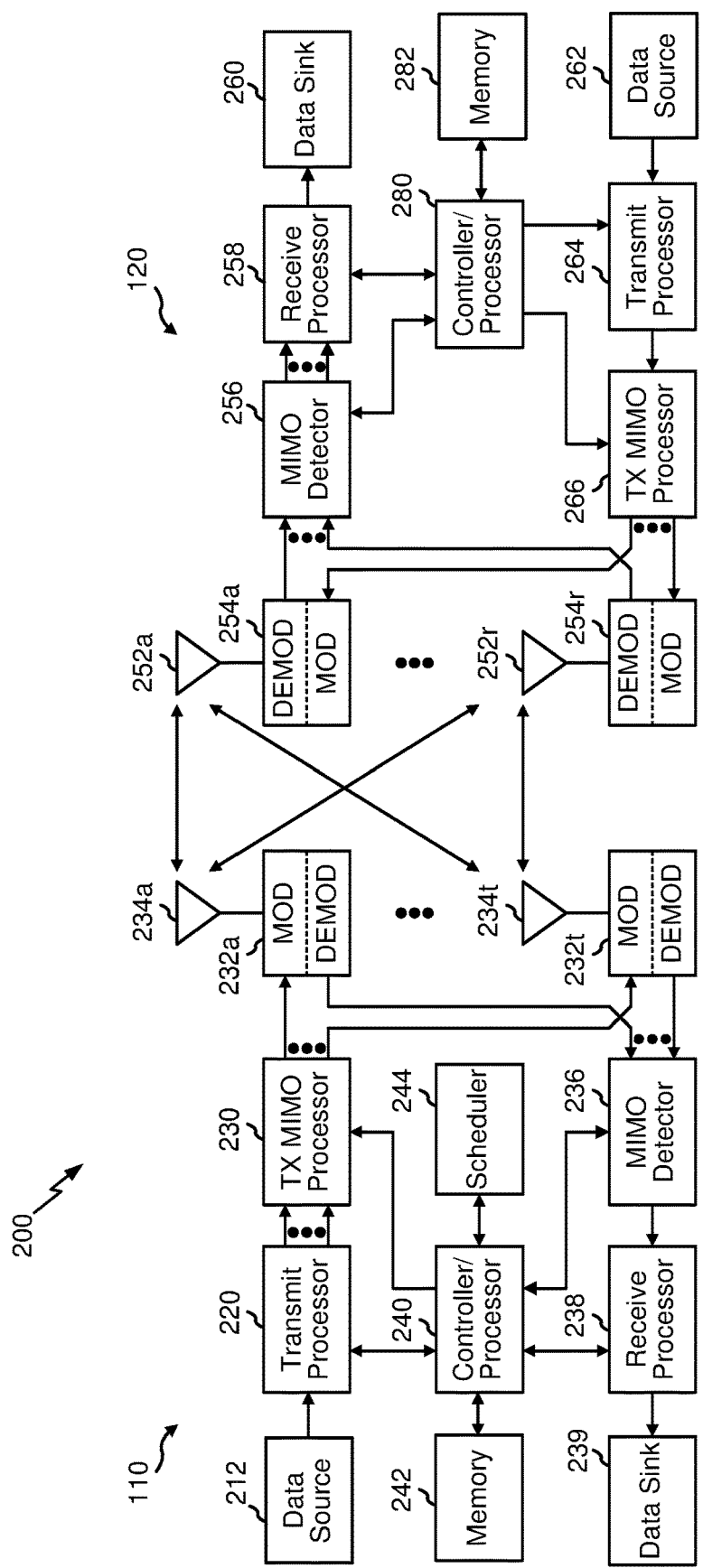
FIG. 2 is a block diagram conceptually illustrating a design of a base station and a mobile station configured according to one aspect of the present disclosure.

FIG. 2 shows a block diagram of a design of a base station 110 and a mobile station 120, which may be one of the base stations and one of the mobile stations in FIG. 1. For a restricted association scenario, the base station 110 may be the macro base station 110c in FIG. 1, and the mobile station 120 may be the mobile station 120y. The base station 110 may also be a base station of some other type. The base station 110 may be equipped with antennas 234a through 234t, and the mobile station 120 may be equipped with antennas 252a through 252r.

At the base station 110, a transmit processor 220 may receive data from a data source 212 and control information from a controller/processor 240. The processor 220 may process (e.g., encode and symbol map) the data and control information to obtain data symbols and control symbols, respectively. The processor 220 may also generate reference symbols, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the mobile station 120, the antennas 252a through 252r may receive the downlink signals from the base station 110 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the mobile station 120 to a data sink 260, and provide decoded control information to a controller/processor 280.

On the uplink, at the mobile station 120, a transmit processor 264 may receive and process data from a data source 262 and control information from the controller/processor 280. The transmit processor 264 may also generate reference symbols for a reference signal. The symbols from the transmit processor 264 may be precoded by a TX MIMO processor 266 if applicable, further processed by the demodulators 254a through 254r (e.g., for SC-FDM, etc.), and transmitted to the base station 110. At the base station 110, the uplink signals from the mobile station 120 may be received by the antennas 234a through 234t, processed by the modulators 232a through 232t, detected by a MIMO detector 236 if applicable, and further processed by a receive processor 238 to obtain decoded data and control information sent by the mobile station 120. The receive processor 238 may provide the decoded data to a data sink 239 and the decoded control information to the controller/processor 240.

The controllers/processors 240 and 280 may direct the operation at the base station 110 and the mobile station 120, respectively. The processor 240 and/or other processors and modules at the base station 110 may perform or direct, e.g., the execution of various processes for the techniques described herein. The processor 280 and/or other processors and modules at the mobile station 120 may also perform or direct, e.g., the execution of the functional blocks illustrated in FIGS. 9-12, and/or other processes for the techniques described herein. The memories 242 and 282 may store data and program codes for the base station 110 and the mobile station 120, respectively. A scheduler 244 may schedule mobile stations for data transmission on the downlink and/or uplink.

Figure 3:
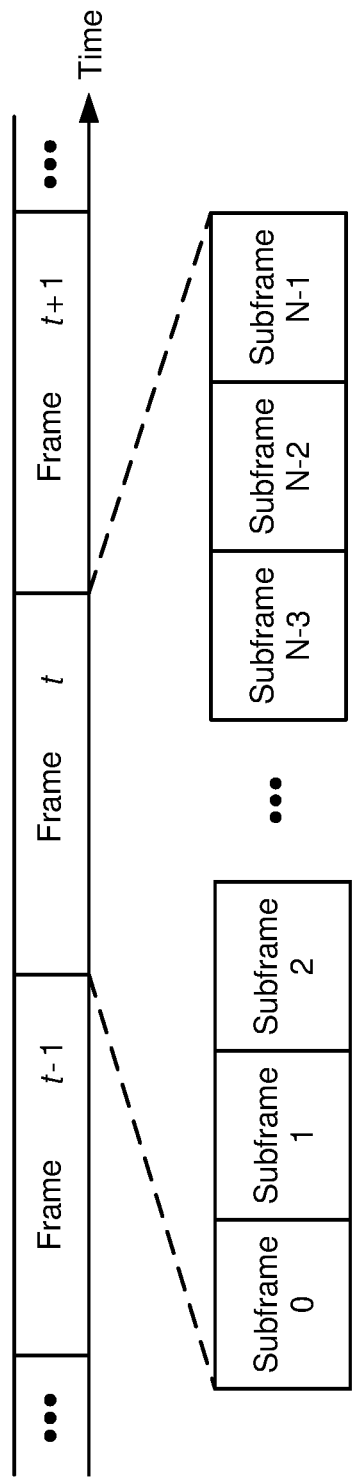
FIG. 3 is a block diagram conceptually illustrating an example of a frame structure in a telecommunications system.

FIG. 3 shows an exemplary frame structure that may be used for communication in the network 100 according to certain aspects. As shown in FIG. 3, a timeline for network communication may be partitioned into frames. Each frame may be partitioned into a plurality of subframes. FIG. 3 shows an example of a frame (labeled "Frame t") comprising N subframes (labeled "Subframe 0" to "Subframe N−1"). In certain aspects, a subframe may be a UL centric subframe, a DL centric subframe, or other type of subframe (e.g., a blank subframe). A UL centric subframe may be used for transmitting UL data from one or more mobile stations 120 to a base station 110, and a DL centric subframe may be used for transmitting DL data from the base station 110 to the one or more mobile stations 120. Examples of UL centric subframes and DL subframes are discussed further below. In one example, a frame may include both UL centric subframes and DL centric subframes. In this example, the ratio of UL centric subframes to DL subframes in a frame may be dynamically adjusted based on the amount of UL data and the amount of DL data that need to be transmitted. For example, if there is more UL data, then the ratio of UL centric subframes to DL subframes may be increased. Conversely, if there is more DL data, then the ratio of UL centric subframes to DL subframes may be decreased.

Figure 4A:
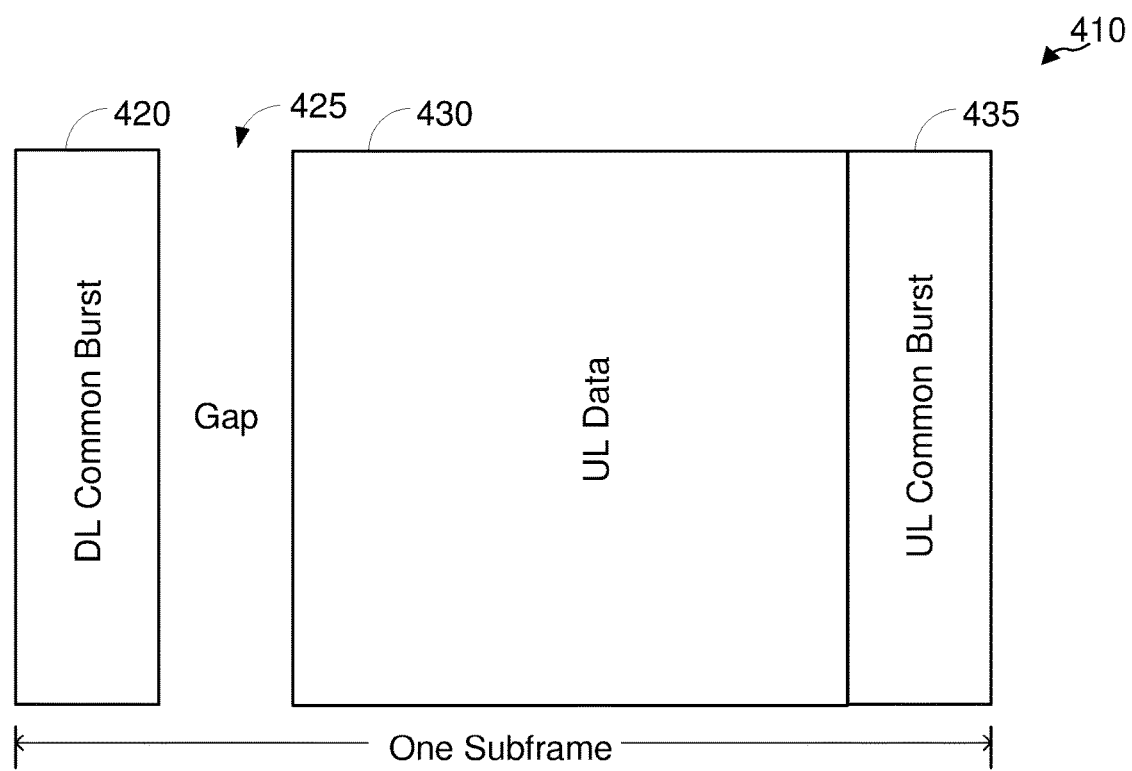
FIG. 4A is a block diagram conceptually illustrating an example of a UL centric subframe structure.

FIG. 4A shows an exemplary UL centric subframe 410 according to certain aspects of the present disclosure. The UL centric subframe 410 may be used for transmitting UL data (e.g., user data) from one or more mobile stations 120 to a base station 110. The UL centric subframe 410 may include a DL common burst 420, a UL data burst 430, and a UL common burst 435. The DL common burst 420 may include symbols (e.g., OFDM symbols) that contain DL control information, examples of which are provided below. The UL common burst 435 may include symbols (e.g., OFDM symbols) that contain UL control information, examples of which are provided below. The UL data burst 430 includes UL data that is transmitted from the one or more mobile stations 120 to the base station 110, and may include user data (e.g., video data, audio data, data files, voice data, web pages, etc.). The DL common burst 420 and the UL data burst 430 may be separated by a gap 425 to provide the base station 110 and one or more mobile stations 120 time to transition from DL to UL.

In certain aspects, the base station 110 may transmit control information to the one or more mobile stations 120 in the DL common burst 420. For example, the base station 110 may transmit a UL grant to the one or more mobile stations 120 in the DL common burst 420. The UL grant may indicate resources that are assigned to each mobile station 120 for transmitting UL data to the base station 110 in the UL data burst 430. The resources may include one or more subcarriers, one or more time intervals in the UL data burst 430, or any combination thereof. The base station 110 may assign resources to a mobile station 120 in response to a resource request previously received by the base station 110 from the mobile station 120 (e.g., in a previous subframe). Examples of other types of information that may be included in the DL common burst 420 are discussed further below.

In certain aspects, the one or more mobile stations 120 may transmit resource requests, channel feedback information, ACK/NACK and/or other types of information to the base station 110 in the UL common burst 435. For example, a mobile station 120 may transmit a resource request to the base station 110 in the UL common burst 435 when the mobile station 120 needs to transmit UL data to the base station 110 (e.g., the mobile station has data in a buffer awaiting transmission to the base station). In response to the request, the base station 110 may transmit a UL grant to the mobile station 120 in the DL common burst of one or more subsequent subframes. Examples of channel feedback information that may be included in the UL common burst 435 are discussed further below.

The time duration of the subframe 410 may be one ms or less. In some examples, the time duration may be 500 μs or less, 200 μs or less, or 100 μs or less. In some examples, the duration may be expressed in terms of symbol periods. For example, the subframe may span a minimum of four symbols total, in which the first symbol corresponds to the DL common burst 420, the second symbol corresponds the gap 425, the third symbol corresponds to the UL data burst 430, and the fourth symbol corresponds to the UL common burst 435. In these examples, the subframe may span a total of four symbols, eight symbols, 16 symbols, 32 symbols, 64 symbols, etc.

In certain aspects, the time duration of the subframe 410 may be dynamically scaled based on a latency requirement. For example, the time duration of the subframe 410 may be set to any one of a plurality of different time durations (e.g., 500 μs, 250 μs, 125 μs, etc.). In this example, the base station 110 may select one of the subframe time durations based on a latency requirement (e.g., latency requirement for UL data). The selected subframe time duration may be a fraction of the latency requirement. In cases where latency is not critical, the base station 110 may select a longer subframe time duration for spectral efficiency.

After selecting the subframe time duration, the base station 110 may transmit an indication of the selected subframe time duration to the one or more mobile stations 120 (e.g., in the DL common burst 420) so that the one or more mobile stations 120 are aware of the selected subframe time duration. In one example, each one of the subframe time durations may have corresponding time durations for the DL common burst 420, the UL data burst 430, and the UL common burst 435. In this example, when one of the subframe time durations is selected, the base station 110 may transmit (e.g., control information) to the one or more mobile stations 120 in the DL common burst 420 within the corresponding time duration for the DL common burst 420, and the one or more mobile stations 120 may transmit (e.g., UL data, feedback information, etc.) to the base station within the corresponding time durations for the UL data burst 430 and the UL common burst 435. In this example, the corresponding time durations for the DL common burst 420, the UL data burst 430 and UL common burst 435 for each one of the subframe time durations may be known a priori by the one or more mobile stations 120 (e.g., stored in memory). Thus, in this example, a mobile station 120 can determine the time durations for the DL common burst 420, the UL data burst 430 and UL common burst 435 based on the selected subframe time duration.

In one example, the duration of the DL common burst 420 and/or duration of the UL common burst 430 may be the same (fixed) for the different subframe time durations. In this example, the duration of the UL data burst 430 may be scaled to achieve the different subframe time durations. In one example, the gap 425 may be approximately the same for the different subframe time durations.

Figure 4B:
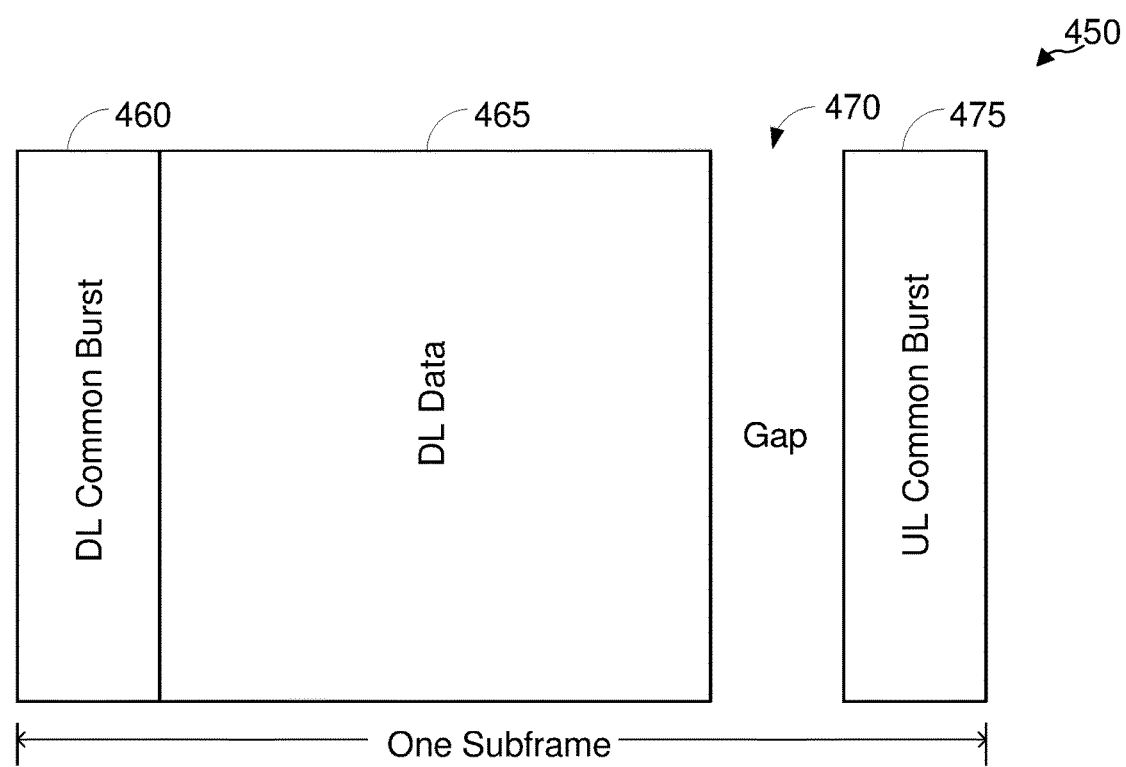
FIG. 4B is a block diagram conceptually illustrating an example of a DL centric subframe structure.

FIG. 4B shows an exemplary DL centric subframe 450 according to certain aspects of the present disclosure. The DL centric subframe 450 may be used for transmitting DL data (e.g., user data) from the base station 110 to one or more mobile stations 120. The DL centric subframe 450 may include a DL common burst 460, a DL data burst 465, and a UL common burst 475. The DL common burst 460 may include symbols (e.g., OFDM symbols) that contain DL control information, examples of which are provided below. The UL common burst 475 may include symbols (e.g., OFDM symbols) that contain UL control information, examples of which are provided below. The DL data burst 460 includes DL data that is transmitted from the base station 110 to the one or more mobile stations 120, and may include user data (e.g., video data, audio data, data files, voice data, web pages, etc.). The DL data burst 465 and the UL common burst 475 may be separated by a gap 470 to provide the base station 110 and one or more mobile stations 120 time to transition from DL to UL.

In certain aspects, the base station 110 may transmit control information to the one or more mobile stations 120 in the DL common burst 460. For example, the base station 110 may transmit a DL grant to the one or more mobile stations 120 in the DL common burst 460. The DL grant may indicate resources in the DL data burst 465 that are assigned to each mobile station 120 for receiving DL data from the base station 110. The resources may include one or more subcarriers, one or more time intervals in the DL data burst 465, or any combination thereof. The base station 110 may assign resources to a mobile station 120 when the base station 110 transmits DL data (e.g., user data) to the mobile station 120. During the DL data burst 465, the base station 110 transmits DL data to the mobile station 120 according to the assigned resources, and the mobile station 120 receives the DL data according to the assigned resources.

In one example, the base station 110 may transmit a demodulation reference signal (DMRS) in the DL common burst 460. LTE-A introduced transmission mode TM 9. TM9 performs precoded DMRS-based transmission. At the mobile station side, DMRS may be used for demodulation. In the DL centric subframe 450, the DMRS may be channelized in the DL common burst for subsequent DL data burst decoding. The DMRS is configured to assist one or more mobile stations 120 demodulate DL data received from the base station in the DL data burst 430. The DL data may be modulated using QPSK, 16QAM, 64QAM, etc. The DMRS may comprise a sequence that is known a priori by the one or more mobile stations (also referred to as a pilot), and used by the one or more mobile stations 120 to perform channel estimation for demodulation. For example, the DMRS may include a Zadoff-Chu sequence, a base sequence that is rotated by a cyclic shift, and/or any other sequence used for assisting demodulation at a receiver. The base station may transmit the DMRS across approximately the entire frequency band of the DL common burst. Thus, the base station 110 may transmit the DMRS in the DL common burst 460, and the one or more mobile stations 120 may receive the DMRS and use the received DMRS to perform channel estimation for demodulating DL data received in the DL data burst 465. Other types of information that may be included in the DL common burst 460 are discussed further below.

The time duration of the subframe 450 may be one ms or less. In some examples, the time duration may be 500 μs or less, 200 μs or less, or 100 μs or less. In some examples, the duration may be expressed in terms of symbol periods. For example, the subframe may span a minimum of four symbols total, in which the first symbol corresponds to the DL common burst 460, the second symbol corresponds the DL data burst 465, the third symbol corresponds to the gap 470, and the fourth symbol corresponds to the UL common burst 475. In these examples, the subframe may span a total of four symbols, eight symbols, 16 symbols, 32 symbols, 64 symbols, etc.

In certain aspects, the time duration of the DL centric subframe 450 may be dynamically scaled based on a latency requirement (e.g., latency requirement for DL data) in a similar manner as the UL centric subframe 410 discussed above.

In the examples in FIGS. 4A and 4B, both the UL centric subframe 410 and the DL centric subframe 450 include a DL common burst at the beginning of the subframe and a UL common burst at the end of the subframe. In these example, UL data is transmitted between the DL common burst and UL common burst for the UL centric subframe 410, and DL data is transmitted between the DL common burst and UL common burst for the DL centric subframe 450. Also, in these example, both the UL centric subframe 410 and the DL centric subframe 450 include a gap to provide time for switching from DL to UL.

It is to be appreciated that other subframe structures may also be used. For example, the portion of the subframe between the DL common burst and the UL common burst may be left blank to free up the corresponding frequency spectrum for transmission and/or reception by other devices. In this example, the base station and/or the one or more mobile stations may refrain from transmitting in the portion of the subframe between the DL common burst and the UL common burst. This subframe structure may be used when the one or more of the other devices request use of the frequency spectrum (e.g., the base station may select this subframe structure in response to a request by one or more of the other devices for the spectrum).

Figure 5A:
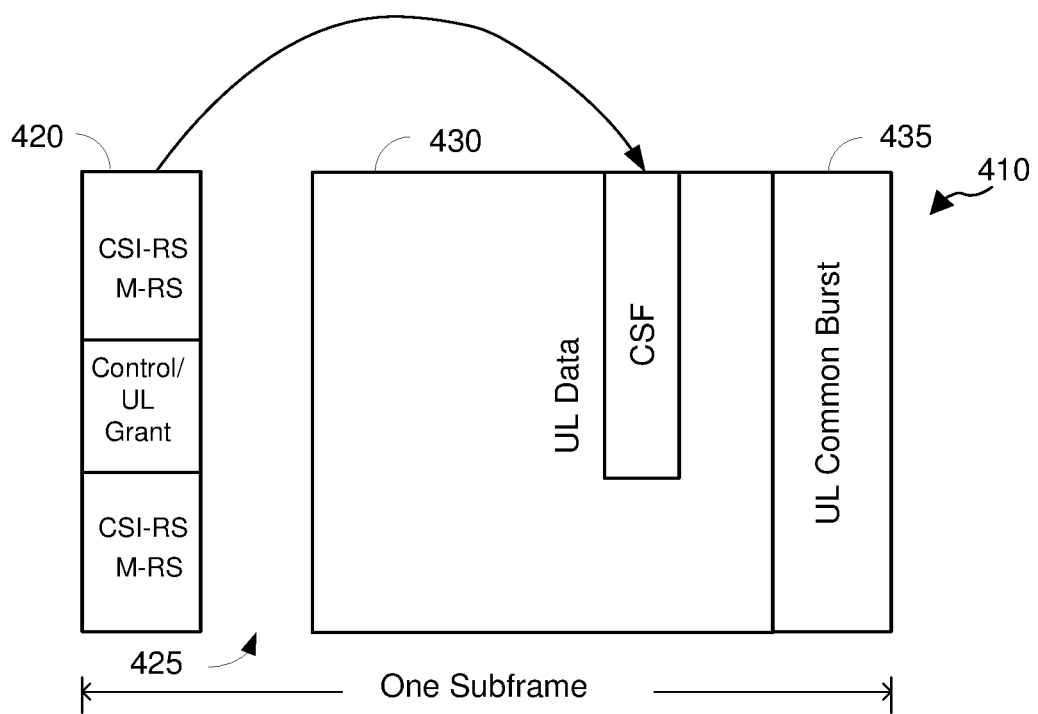
FIG. 5A is a block diagram conceptually illustrating an example of a UL centric subframe structure including a CSI-RS and CSF information.

FIG. 5A shows an example in which a UL centric subframe 410 is configured to facilitate channel state feedback according to certain aspects of the present disclosure. In this example, the DL common burst 420 may include a control region (labeled "Control" in FIG. 5A) used for transmitting control information (e.g., UL grant carried in a physical downlink control channel (PDCCH)) to one or more mobile stations 120). The DL common burst 420 may also include a channel state information reference signal (CSI-RS). As discussed further below, the one or more mobile stations 120 use the CSI-RS to provide the base station 110 with channel state feedback (CSF). It is to be appreciated that FIG. 5A does not necessarily depict the actual frequency and/or time resources allocated to the control region and CSI-RS in the DL common burst. In certain aspects, the CSI-RS may be transmitted across approximately the entire frequency band of the DL common burst 420 to allow a mobile station 120 to estimate the channel between the base station 110 and the mobile station 120 across the entire frequency band. In certain aspects, the control region may be transmitted in a subband of the DL common burst 420. The subband may span ⅕ or less of the frequency band of the DL common burst 420. In one example, the subband by be approximately centered within the frequency band of the DL common burst.

In the example in FIG. 5A, the base station 110 transmits the CSI-RS to the one or more mobile stations 120 in the DL common burst 420. The base station 110 also transmits a UL grant in the control region indicating resources that are assigned to each mobile station 120 for transmitting UL data to the base station 110 in the UL data burst 430. The CSI-RS may comprise one or more sequences that are known a priori by the one or more mobile stations 120 (also referred to as pilots). Each mobile station 120 may receive the CSI-RS and use the received CSI-RS to estimate the channel between the base station 110 and mobile station 120. The mobile station may then generate CSF information based on the channel estimation.

The CFS information may include a channel quality indicator (CQI), a rank indicator (RI) and/or precoding matrix indicator (PMI). The CQI may indicate a modulation coding scheme (MCS) to be used for DL transmission from the base station 110 to the mobile station 120 based on the channel estimation. The RI may indicate a number of layers for the DL transmission, and the PMI may map the layers to antennas 234*a* to 234*t* of the base station 110.

In certain aspects, the base station 110 may transmit DL data to the mobile station 120 using any one of a plurality of different MCSs, where each MCS corresponds to a modulation and coding rate pair. In this example, a mobile station 110 may select one of the MCSs based on the channel estimation and generate a CQI indicating the selected MCS. For example, the mobile station 120 may select a MCS with a higher-order modulation scheme if the estimated channel is good to increase data throughout and select a MCS with a lower-order modulation scheme if the estimated channel is poor. In one example, each of the MCSs may be identified by a unique CQI index known by the base station 110 and mobile station 120. In this example, the mobile station 120 may indicate the selected MCS using the respective CQI index. In response to receiving the CQI, the base station 110 may transmit DL data to the mobile station 120 according to the indicated MCS in a subsequent subframe (e.g., subsequent DL centric subframe).

A mobile station 120 may transmit CSF information to the base station in the UL data burst 430 according to certain aspects. For example, the mobile station 120 may transmit the CSF information in the UL data burst 430 of the same subframe 410 in which the respective CSI-RS is transmitted. In this regard, FIG. 5A shows an example in which the base station 110 transmits the CSI-RS in the DL common burst 420 of a subframe, and the mobile station 120 transmits the respective CSF information in the UL data burst 430 of the same subframe. The CSF may be transmitted using time and frequency resources in the UL data burst 430 assigned to the mobile station 120 for transmitting the CSF information. For example, the base station may indicate the resources assigned to the mobile station 120 for the CSF information in the DL common burst 420 of the same subframe or in the DL common burst of a previous subframe. The mobile station 120 may also transmit UL data to the base station 110 in the UL data burst 430 using resources assigned to the mobile station 120 in the UL grant.

Figure 5B:
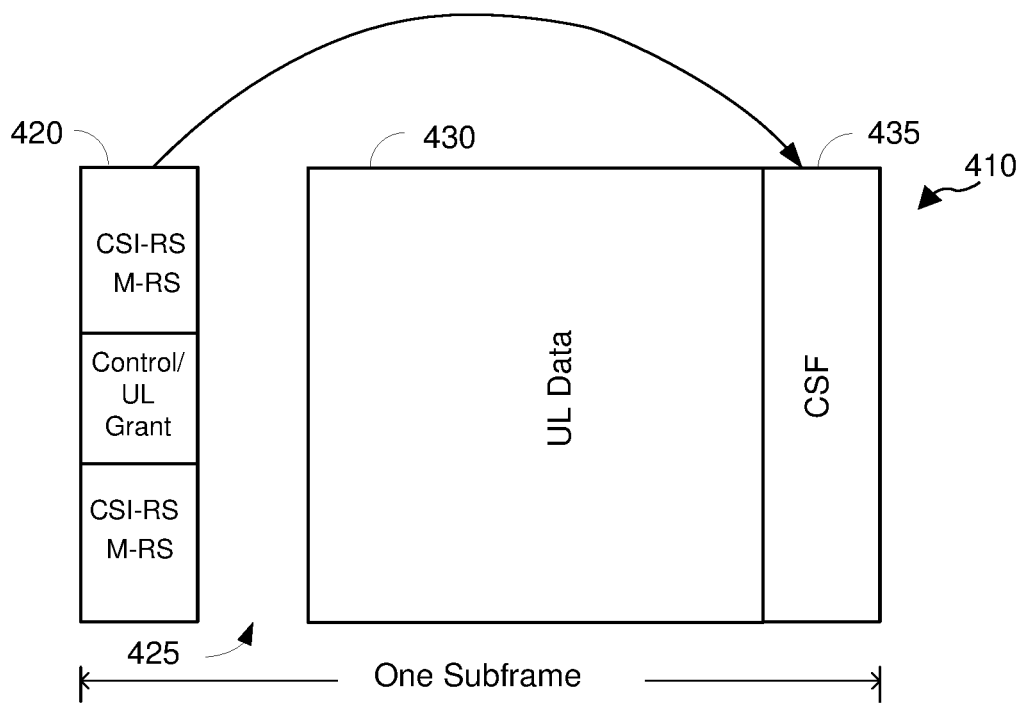
FIG. 5B is a block diagram conceptually illustrating another example of a UL centric subframe structure including a CSI-RS and CSF information.

The mobile station 120 may also transmit CSF information to the base station in the UL common burst 435 according to certain aspects. For example, the mobile station 120 may transmit the CSF information in the UL common burst of the same subframe 410 in which the respective CSI-RS is transmitted. In this regard, FIG. 5B shows an example in which the base station 110 transmits the CSI-RS in the DL common burst 420 of a subframe, and the mobile station 120 transmits the respective CSF information in the UL common burst 435 of the same subframe. The CSF may be transmitted using time and frequency resources in the UL common burst 435 assigned to the mobile station 120 for transmitting the CSF information. For example, the base station 110 may indicate resources assigned to the mobile station 120 for the CSF information in the DL common burst 420 of the same subframe or in the DL common burst of a previous subframe. In another example, the time and frequency resources used for transmitting the CSF information may be preconfigured. For example, the UL common burst may have a predefined channel structure in which certain types of information (e.g., CSF information, ACK/NACK, resource request, etc.) are transmitted on predetermined channels in the UL common burst 435. Each channel may correspond to one or more subcarriers and/or one or more time intervals in the UL common burst 435.

Figure 5C:
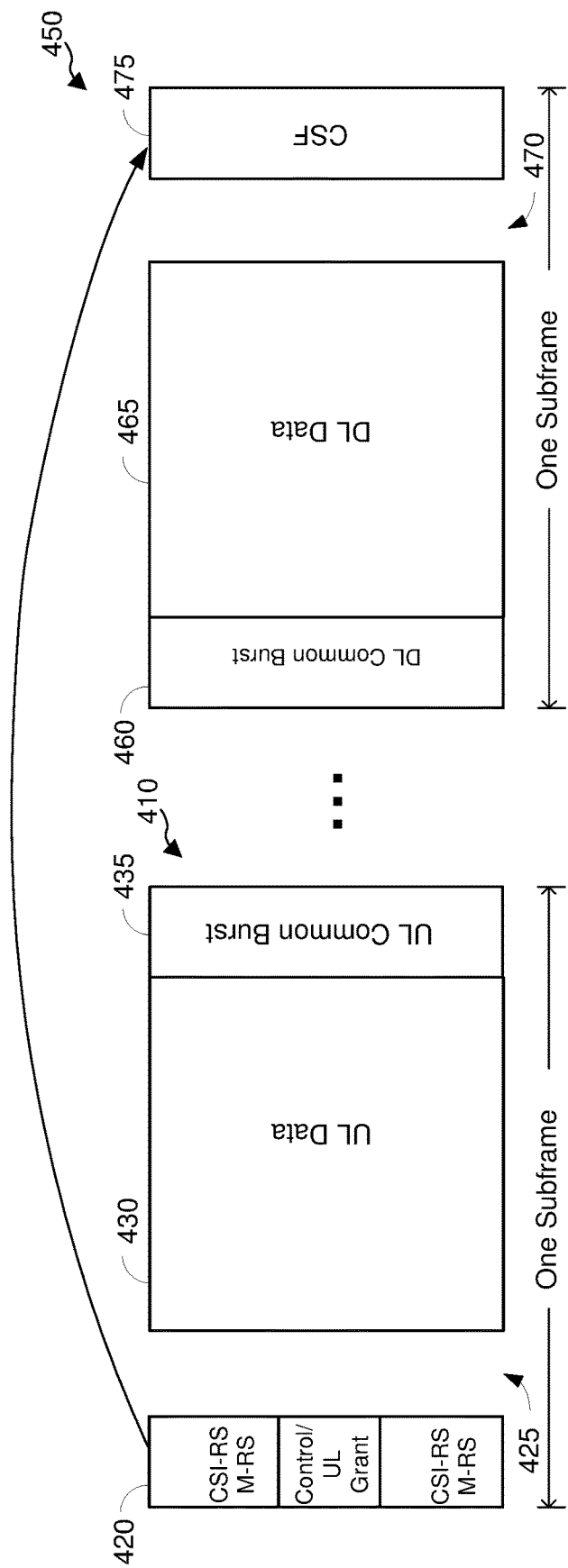
FIG. 5C is a block diagram conceptually illustrating an example of a UL centric subframe structure including a CSI-RS and a subsequent subframe including CSF information related to the CSI-RS.

The mobile station 120 may also transmit CSF information to the base station in a subsequent subframe according to certain aspects. In this regard, FIG. 5C shows an example in which the base station 110 transmits the CSI-RS in the DL common burst 420 of a subframe 410, and the mobile station 120 transmits the respective CSF information in the UL common burst 475 of a subsequent subframe 450. For example, the mobile station 120 may transmit the CSF information in the subsequent subframe if the mobile station 120 needs more processing time to generate the CSF information. In the example in FIG. 5C, the subsequent subframe 450 is a DL centric subframe. However, it is to be appreciated that the subsequent subframe 450 may be another UL centric subframe. The CSF may be transmitted using resources in the UL common burst 475 of the subsequent subframe assigned to the mobile station 120 for transmitting the CSF information. For example, the base station 110 may indicate the resources assigned to the mobile station for the CSF information in the DL common burst 420 of subframe 410 or subframe 450. In another example, the resources used for transmitting the CSF information may be preconfigured, as discussed above.

Figure 6A:
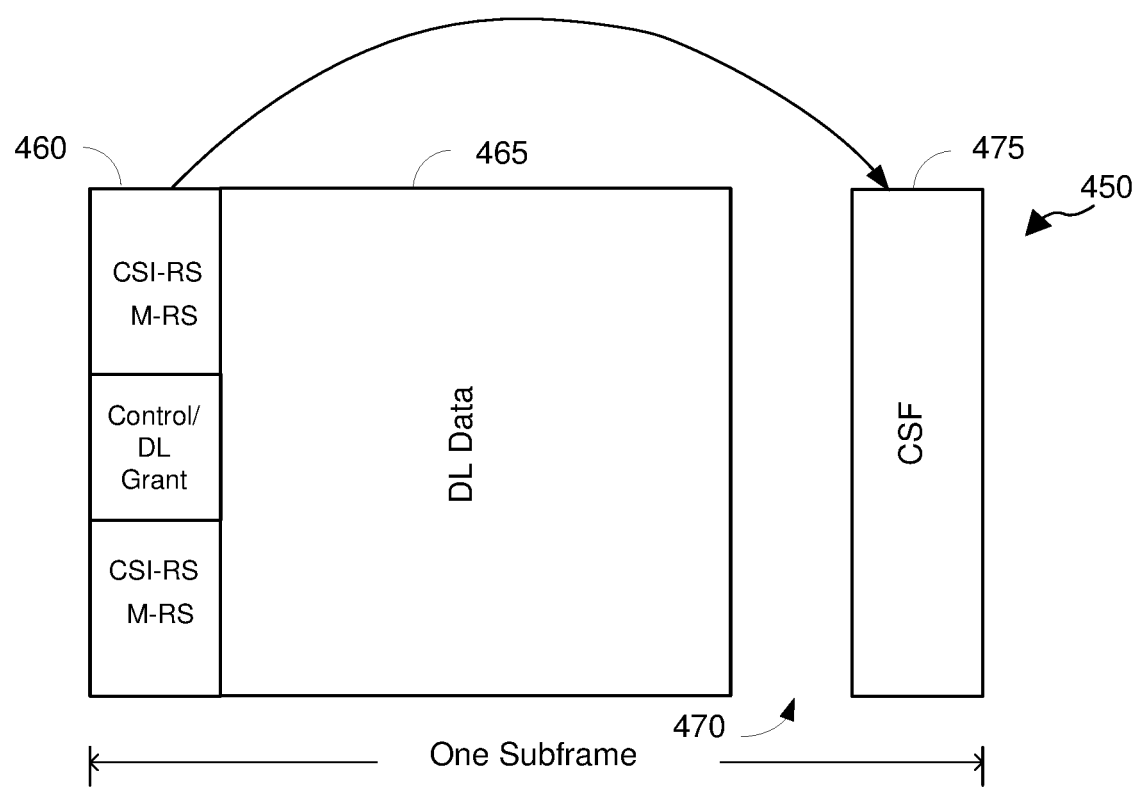
FIG. 6A is a block diagram conceptually illustrating an example of a DL centric subframe structure including a CSI-RS and CSF information in a common burst of the same subframe.

The base station 110 may also transmit the CSI-RS in a DL centric subframe. In this regard, FIG. 6A shows an example in which a DL centric subframe 450 is configured to facilitate channel state feedback according to certain aspects of the present disclosure. In this example, the DL common burst 460 may include a control region (labeled "Control" in FIG. 6A) used for transmitting control information (e.g., DL grant) to the one or more mobile stations 120. The DL common burst 420 may also include CSI-RS.

In the example in FIG. 6A, the base station 110 transmits the CSI-RS to one or more mobile stations 120 in the DL common burst 460. The base station 110 also transmits a DL grant indicating resources that are assigned to each mobile station 120 for receiving DL data (e.g., user data) from the base station 110 in the DL data burst 465. The CSI-RS may comprise one or more sequences that are known a priori by the one or more mobile stations (also referred to as pilots). A mobile station 120 may receive the CSI-RS and use the received CSI-RS to estimate the channel between the base station 110 and mobile station 120. The mobile station may then generate respective CSF information based on the channel estimation, as discussed above. In the example in FIG. 6A, the mobile station 120 transmits the respective CSF information to the base station 110 in the UL common burst 475 of the same subframe 450 in which the respective CSI-RS is transmitted. The CSF may be transmitted using resources in the UL common burst 475 assigned to the mobile station for transmitting the CSF information. For example, the base station 110 may indicate the resources assigned to the mobile station for the CSF information in the DL common burst 460 of the same subframe or in the DL common burst of a previous subframe. In another example, the resources used for transmitting the CSF information may be preconfigured, as discussed above.

Figure 6B:
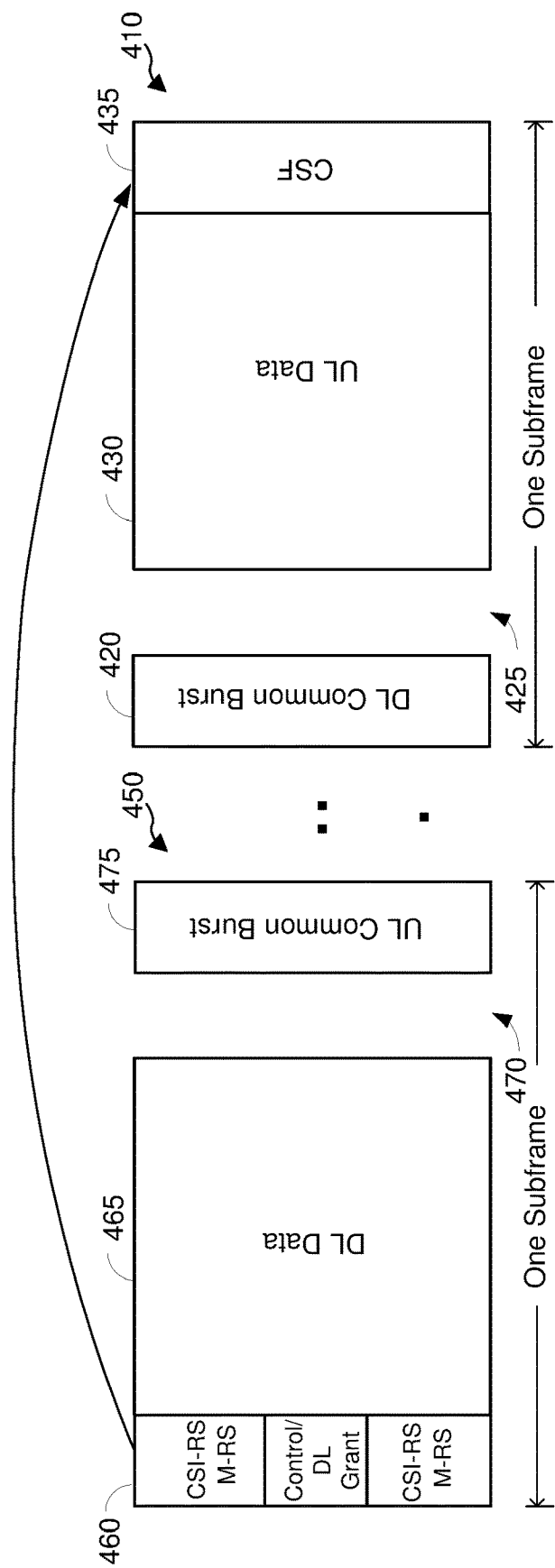
FIG. 6B is a block diagram conceptually illustrating an example of a DL centric subframe structure including a CSI-RS and a subsequent subframe including CSF information related to the CSI-RS in a common burst of the subsequent subframe.

The mobile station 120 may also transmit CSF information to the base station 110 in a subsequent subframe according to certain aspects. In this regard, FIG. 6B shows an example in which the base station transmits the CSI-RS in the DL common burst 460 of a subframe 450, and the mobile station transmits the respective CSF information in the UL common burst 435 of a subsequent subframe 410. In the example in FIG. 6B, the subsequent subframe 410 is a UL centric subframe. However, it is to be appreciated that the subsequent subframe may also be another DL centric subframe. The CSF may be transmitted using resources in the UL common burst 435 of the subsequent subframe assigned to the mobile station 120 for transmitting the CSF information. For example, the base station 110 may indicate the resources assigned to the mobile station 120 for the CSF information in the DL common burst 435 of subframe 450 or subframe 410. In another example, the resources used for transmitting the CSF information may be preconfigured, as discussed above.

Figure 6C:
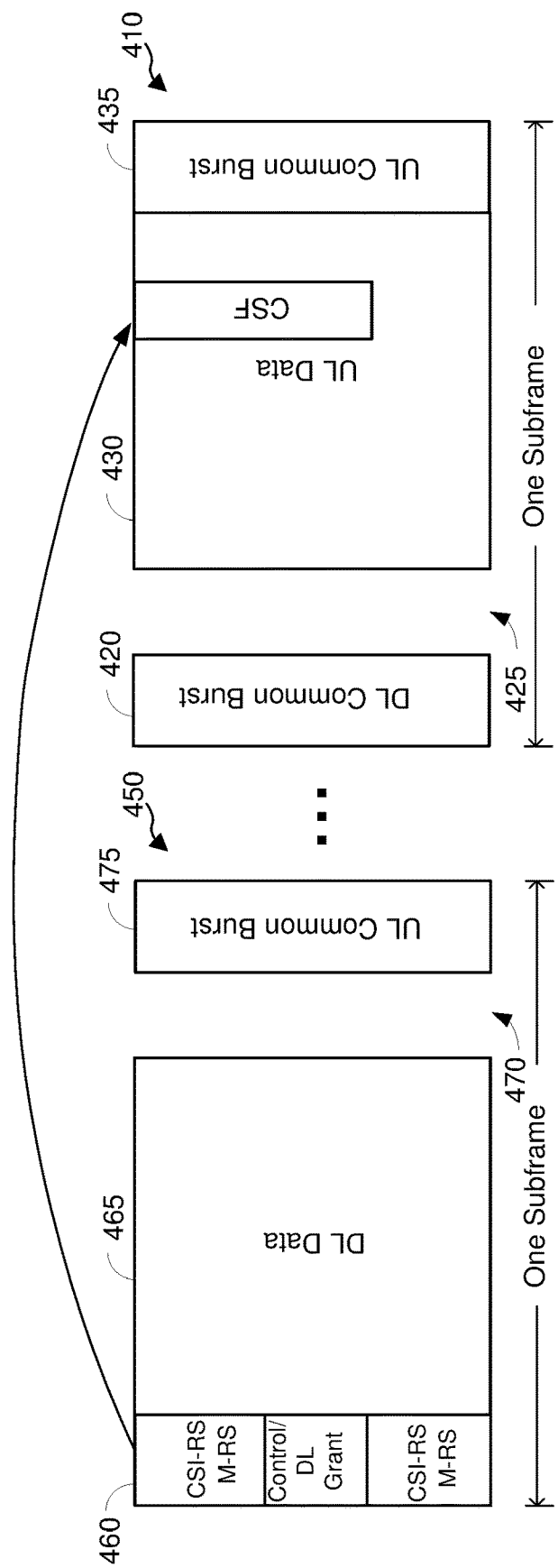
FIG. 6C is a block diagram conceptually illustrating another example of a DL centric subframe structure including a CSI-RS and a subsequent subframe including CSF information related to the CSI-RS in a data burst of the subsequent subframe.

FIG. 6C shows another example in which the base station 110 transmits the CSI-RS in the DL common burst 460 of a subframe 450, and the mobile station 120 transmits the respective CSF information in the UL data burst 465 of a subsequent UL centric subframe 410. The CSF may be transmitted using resources in the UL data burst 430 of the subsequent subframe assigned to the mobile station 120 for transmitting the CSF information. For example, the base station 110 may indicate the resources assigned to the mobile station 120 for the CSF information in the DL common burst of subframe 450 or subframe 410.

In certain aspects, the DL common burst of a subframe may include a measurement reference signal (M-RS) to facilitate handover of a mobile station 120 according to certain aspects of the present disclosure as shown in FIGS. 5A-5C, 7A and 7B. In this regard, FIGS. 5A-5C show examples in which the DL common burst 420 of a UL centric subframe 410 includes an M-RS, and FIGS. 6A-6C show examples in which the DL common burst 460 of a DL centric subframe includes an M-RS. The M-RS may comprise a sequence that is known a prior by a mobile station 120 (also referred to as a pilot). The mobile station 120 may receive the M-RS and measure receive signal strength or signal quality using the received M-RS. The mobile station may report the measured signal strength or signal quality to the base station 110 (e.g., in the UL common burst 435 or 475 of the same subframe in which the respective M-RS is transmitted or in the UL common burst of a subsequent subframe). The mobile station 120 and/or base station 110 may determine whether to trigger a handover event for the mobile station 120 based on the measured signal strength or signal quality, as discussed further below. The handover event may involve handing over the mobile station 120 from a current serving cell to another cell. A cell may correspond to a coverage area of a respective base station. In one example, the M-RS may comprise a cell-specific reference signal (CRS) that is specific to a cell (e.g., generated based on a cell identity (ID)). The M-RS may be transmitted across approximately the entire frequency band of the DL common burst or a portion of the frequency band. In some aspects, the M-RS may be channelized on one antenna at the transmitter while the CSI-RS may be channelized on multiple antennas at the transmitter (e.g., for MIMO processing).

As discussed above, the mobile station 120 may receive the M-RS in the DL common burst, and measure signal strength or signal quality using the received M-RS. In one example, the mobile station 120 may compare the measured strength or quality to a threshold (e.g., absolute level). If the measured strength or quality is equal to or exceeds the threshold, then the mobile station 120 may determine to remain in the current cell. If the measured strength or quality is below the threshold, then the mobile station 120 may trigger a handover event. In this case, the mobile station 120 may transmit a handover request to the base station 110 of the serving cell in the UL common burst 435. The mobile station may transmit the handover request in the UL common burst of the same subframe as the respective M-RS or in the UL common burst of a subsequent subframe. In response, the base station 110 may initiate a handover procedure to handover the mobile station 120 to another cell.

In another example, the mobile station 120 may report the measured strength or quality to the base station 110 in the UL common burst of the same subframe as the respective M-RS or in the UL common burst of a subsequent subframe. The base station 110 may then make a determination whether to initiate handover based on the measured strength or quality. For example, the base station 110 may compare the measured strength or quality to a threshold (e.g., absolute level), and initiate handover if the measured strength or quality is below the threshold.

In another example, the mobile station 120 may also measure signal strength or signal quality for another cell (i.e., a cell other than the cell currently serving the mobile station). To do this, the mobile station 120 may receive an M-RS from the other cell, and measure the signal strength or signal quality for the other cell based on the M-RS. In this example, the M-RS from the serving cell may comprise a CRS specific to the serving cell, and the M-RS from the other cell may comprise a CRS specific to the other cell. This allows the mobile station 120 to differentiate between the M-RS from the serving cell and the M-RS from the other cell. In this example, the mobile station 120 may compare the measured signal strength or signal quality for the serving cell with the measured signal strength or signal quality for the other cell. If the measured strength or quality of the serving cell is equal to or exceeds the measured strength or quality of the other cell, then the mobile station 120 may determine to remain in the serving cell. If the measured strength or quality of the serving cell is below the measured strength or quality of the other cell, then the mobile station 120 may trigger a handover event. In this case, the mobile station 120 may transmit a handover request to the base station 110 in the UL common burst. The handover request may identify the other cell (include a cell ID of the other cell). The mobile station 120 may transmit the handover request in the UL common burst of the same subframe in which the base station 110 of the serving cell transmitted the M-RS or in the UL common burst of a subsequent subframe. In response to the handover request, the base station 110 may initiate a handover procedure to handover the mobile station 120 to other cell. In one example, reporting of hand over (HO) events are independent of the location of M-RS.

The DL common burst 420 or 460 of a subframe may include a CSI-RS that is shared by a plurality of mobile stations 120. The shared CSI-RS may be transmitted across approximately the entire frequency band of the DL common burst. Alternatively, the DL common burst 420 or 460 of a subframe may include a CSI-RS for each one of a plurality of mobile stations 120. For example, if each mobile station 120 is assigned a different frequency subband for receiving DL data, then the CSI-RS for each mobile station 120 may be transmitted across the respective frequency subband to provide channel estimation for the respective subband. In this case, each of the mobile stations 120 uses the CSI-RS for its subband to estimate the channel between the base station and the mobile station, generates respective CSF information based on the channel estimation, and transmits the respective CSF information to the base station (e.g., in the UL common burst 435 or 475 of the same subframe or subsequent subframe).

The DL common burst 420 or 460 of a subframe may include an M-RS that is shared by a plurality of mobile stations 120. In this case, each of the mobile stations 120 receives the M-RS and uses the received M-RS to measure receive signal strength or signal quality, which is used to make a decision whether to trigger a handover event for the mobile station 120, as discussed above. Alternatively, the DL common burst 420 or 460 of a subframe may include an M-RS for each one of a plurality of mobile stations 120.

In certain aspects, the DL common burst 420 or 460 of a subframe may include control information indicating a configuration of CSI-RS in the subframe. For example, the control information may indicate whether the DL common burst includes a CSI-RS, and if so, on which channel in the DL common burst the CSI-RS is transmitted. The channel may correspond to time and frequency resources in the DL common burst allocated to the CSI-RS. This information allows one or more mobile stations 120 to identify and receive the CSI-RS in the DL common burst. In this example, the base station 110 may dynamically configure transmissions of CSI-RS. When the base station 110 transmits a CSI-RS in a DL common burst, the base station 110 may include control information in the DL common burst indicating the presence of the CSI-RS and the channel on which the CSI-RS is transmitted in the DL common burst. Alternatively, the base station 110 may include the control information in the DL common burst of a previous subframe (i.e., a subframe preceding the subframe in which the CSI-RS is transmitted). In this case, the control information may indicate the subframe in which the CSI-RS is to be transmitted. In one example, the channel on which the CSI-RS is transmitted may be preconfigured (already known by the mobile station), in which case the control information may simply indicate the presence of the CSI-RS in the DL common burst.

The DL common burst 420 or 460 of a subframe may include control information indicating a configuration of M-RS in the subframe. For example, the control information may indicate whether the DL common burst includes an M-RS, and if so, on which channel in the DL common burst the M-RS is transmitted. The channel may correspond to time and frequency resources in the DL common burst allocated to the M-RS. This information allows one or more mobile stations 120 to identify and receive the M-RS in the DL common burst. In this example, the base station 110 may dynamically configure transmissions of M-RSs to the mobile stations. When the base station 110 transmits an M-RS in a DL common burst, the base station may include control information in the DL common burst indicating the presence of the M-RS and the channel on which the M-RS is transmitted in the DL common burst. Alternatively, the base station 110 may include the control information in the DL common burst of a previous subframe (i.e., a subframe preceding the subframe in which the M-RS is transmitted). In this case, the control information may indicate the subframe in which the M-RS is to be transmitted. In one example, the channel on which the M-RS is transmitted may be preconfigured (already known by the mobile station), in which case, the control information may simply indicate the presence of the M-RS in the DL common burst.

Figure 7A:
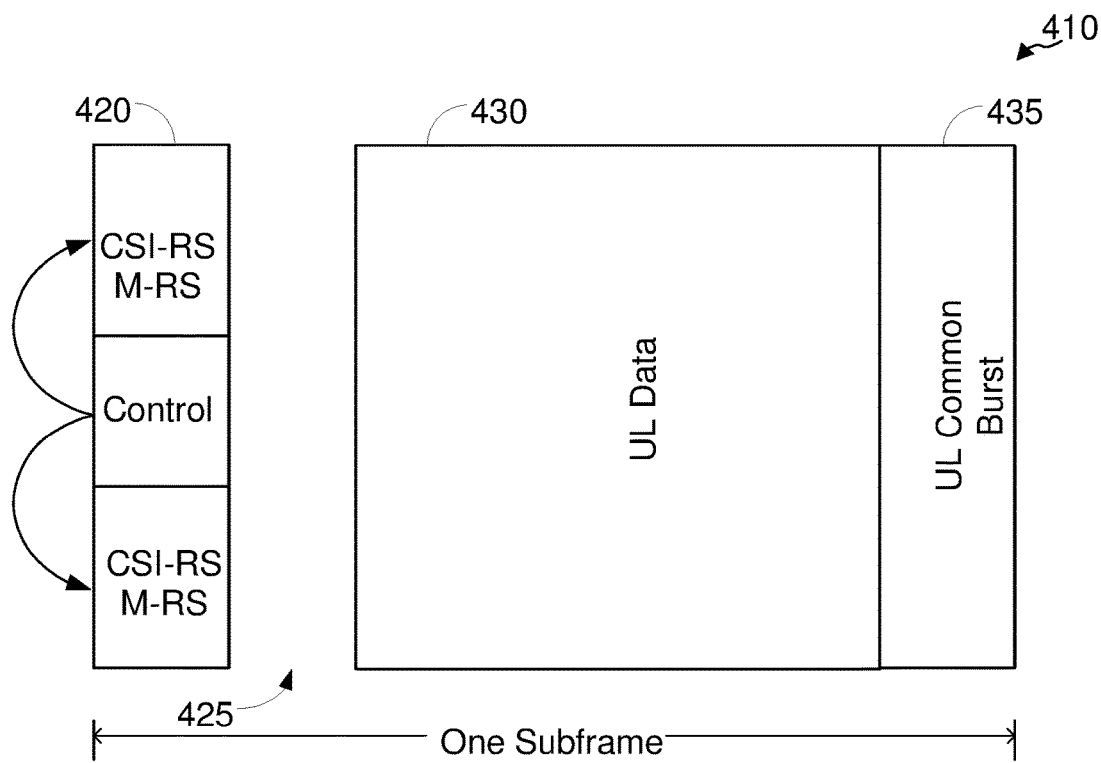
FIG. 7A is a block diagram conceptually illustrating an example of a UL centric subframe structure including control information, a CSI-RS and a M-RS.

FIG. 7A shows an example in which the DL common burst 420 of a UL centric subframe 410 includes control information in the control region indicating the configuration of CSI-RS and M-RS in the subframe. In this example, the control information may indicate the presence of the CSI-RS and M-RS and the channels on which the CSI-RS and M-RS are transmitted in the DL common burst 420. Each channel may correspond to respective time and frequency resources in the DL common burst. As discussed above, the control information allows one or more mobile stations 120 to identify and receive the CSI-RS and M-RS in the DL common burst.

Figure 7B:
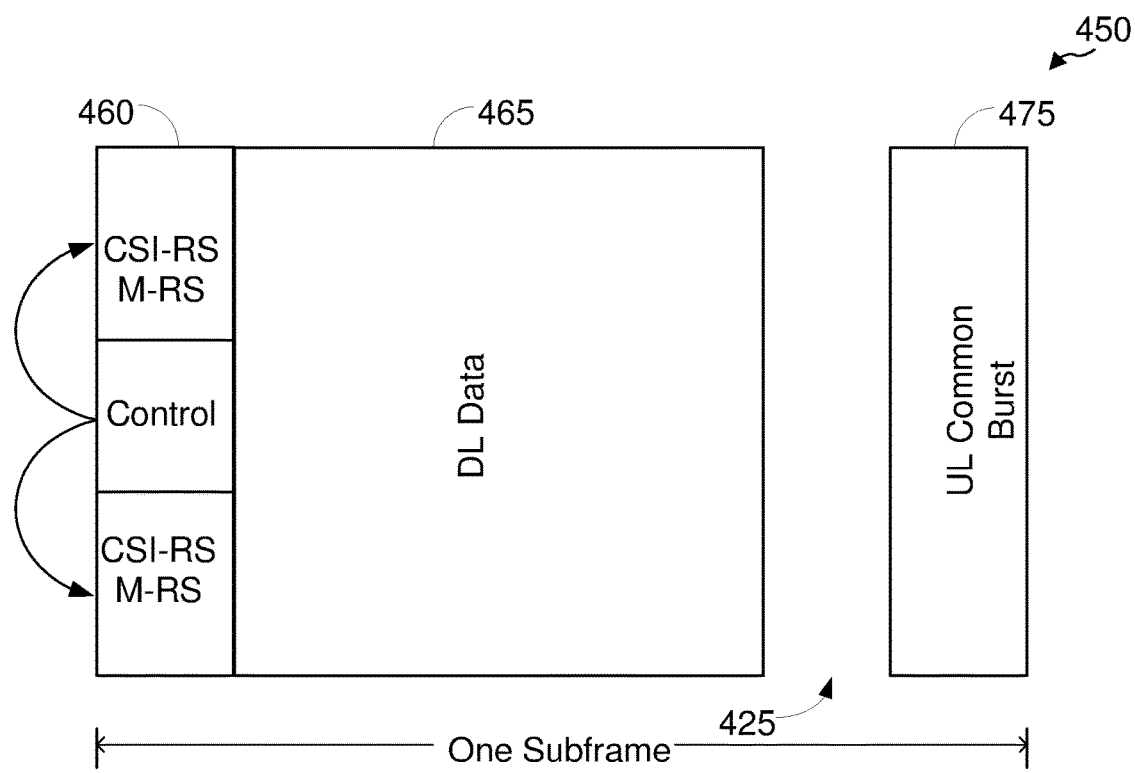
FIG. 7B is a block diagram conceptually illustrating an example of a DL centric subframe structure including control information, a CSI-RS and a M-RS.

FIG. 7B shows another example, in which the DL common burst 420 of a DL centric subframe 450 includes control information in the control region indicating the configuration of CSI-RS and M-RS in the subframe.

In certain aspects, a UL centric subframe 410 may have any one of a plurality of defined subframe formats (configurations) known by the mobile stations 120. A format may have a predefined channel for CSI-RS if the format includes CSI-RS, a predefined channel for M-RS if the format includes MS-RS, a predefined time duration for the UL data burst 435, a predefined channel for CSF information (e.g., channel in the UL data burst 430 or UL common burst 435), a predefined channel for UL grant, and/or any combination thereof. Each format may be identified by a respective format index known by the mobile stations. In these aspects, the base station 110 may select one of the formats for a subframe. For example, the base station 110 may select a format with a short time duration for the UL data burst 465 if low latency is desired. After selecting one of the formats, the base station 110 may include the corresponding format index in the control region of DL common burst 420. Each mobile station may receive and decode the format index to determine which one of the subframe formats is being used.

Similarly, a DL centric subframe 450 may have any one of a plurality of defined subframe formats (configurations) known by the mobile stations 120. A format may have a predefined channel for CSI-RS if the format includes CSI-RS, a predefined channel for M-RS if the format includes MS-RS, a predefined time duration for the DL data burst 435, a predefined channel for CSF information (e.g., channel in the UL common burst 475), a predefined channel for DL grant, predefined channel for DM-RS, and/or any combination thereof. Each format may be identified by a respective format index known by the mobile stations 120. In these aspects, the base station 110 may select one of the formats for a subframe. After selecting one of the formats, the base station 110 may include the corresponding format index in the control region of the DL common burst 460. Each mobile station 120 may receive and decode the format index to determine which one of the subframe formats is being used. Configuration of CS-RS could be indicated by L1 signaling from the control region in the same DL common burst or a previous DL common burst.

The format indexes for UL centric subframes and the format indexes for DL centric subframes may be different so that a mobile station can determine whether a subframe is UL centric or DL centric based on the received format index. In certain aspects, the different subframe formats may use the same channel in the DL common burst for the format index, in which the channel is known by the mobile stations 120. This allows a mobile station 120 to receive and decode the format index before knowing which subframe format is being used.

In certain aspects, the CSI-RS configuration may be semi-static (static across many subframes). In one example, it may be semi-static per cell. In another example, it may be semi-static per mobile station. For example, the base station 110 may transmit the CSI-RS according to a certain periodicity (e.g., once every P number of subframes where P is an integer). The base station 110 may also transmit the CSI-RS in the same channel for each subframe that includes the CSI-RS, in which the channel may correspond to resources allocated to the CSI-RS in a DL common burst. In this example, the base station may communicate the semi-static configuration for CSI-RS to one or more mobile stations 120. For instance, the base station may indicate the periodicity of the CSI-RS and/or channel of the CSI-RS. The base station may transmit the semi-static configuration information to the one or more mobile stations 120 in the DL common burst of a subframe, or in a configuration message (e.g., an RRC connection setup message). After receiving the semi-static configuration information, the one or more mobile stations 120 may receive CSI-RS according the semi-static configuration. This approach reduces overhead since CSI-RS configuration information does not need to be sent in each subframe including CSI-RS.

Similarly, the M-RS configuration may be semi-static (static across many subframes). For example, the base station 110 may transmit the M-RS according to a certain periodicity (e.g., once every M number of subframes where M is an integer). The base station 110 may also transmit the M-RS in the same channel for each subframe that includes the M-RS, in which the channel may correspond to time and frequency resources allocated to the M-RS in a DL common burst. In this example, the base station 110 may communicate the semi-static configuration for M-RS to one or more mobile stations 120. For instance, the base station 110 may indicate the periodicity of the M-RS and/or channel of the M-RS. The base station 110 may transmit the semi-static configuration information to the one or more mobile stations 120 in the DL common burst of a subframe, or in a configuration message (e.g., an RRC connection setup message). After receiving the semi-static configuration information, the one or more mobile stations 120 may receive M-RS according the semi-static configuration. In some aspects, the base station may send the one or more mobile stations 120 semi-static configuration information for CSI-RS and M-RS together (e.g., in the same configuration message).

Figure 8:
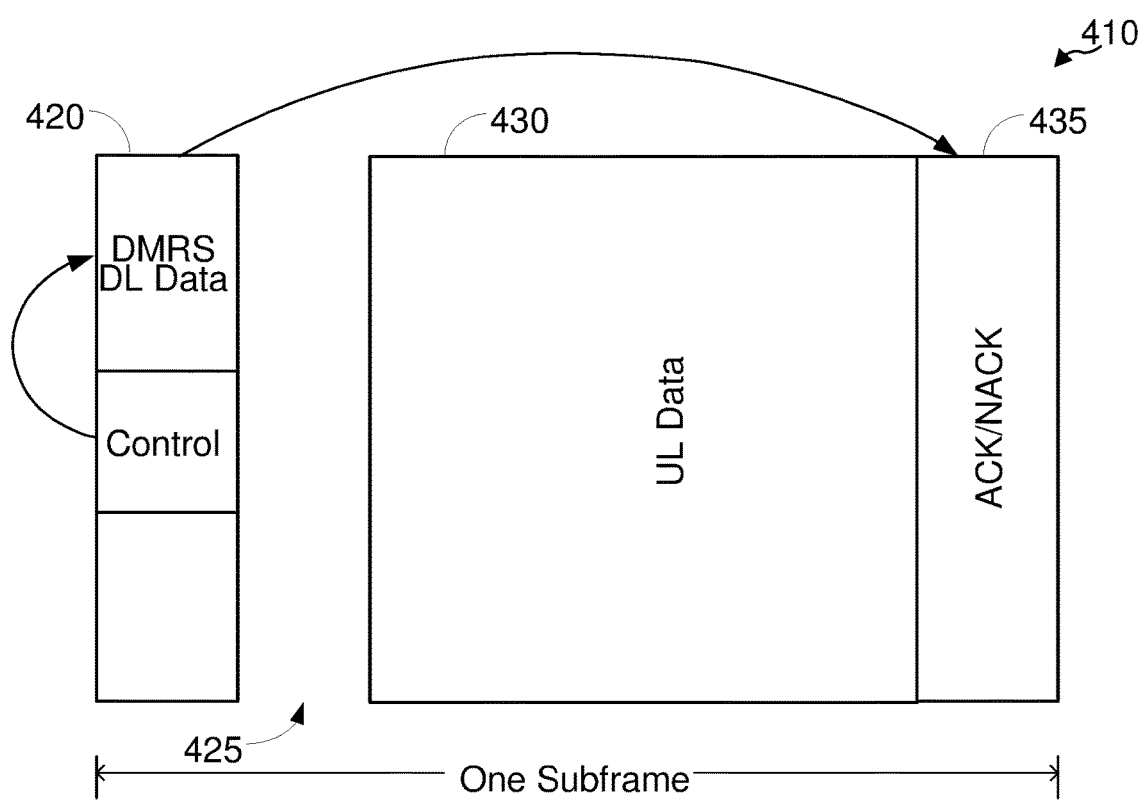
FIG. 8 is a block diagram conceptually illustrating an example of a UL centric subframe structure including DL data and DMRS in a DL common burst.

In certain aspects, the DL common burst of a UL centric subframe 410 may include DM-RS and self contained DL data according to certain aspects of the present disclosure. Low latency DL data may be scheduled in DL common burst of a UL centric subframe. In UL centric subframes, DMRS and DL data may be multiplexed within a DL common burst to enable low latency data transmission, e.g., TDM of DMRS and data tones. In this regard, FIG. 8 shows an example of a UL centric subframe 410, in which the DL common burst 420 includes DL data. The amount of DL data that can be sent in the DL common burst 420 may be relatively small compared with the amount of DL data that can be sent in the DL data burst of a DL centric subframe. The DL data may be included in the DL common burst 430 to transmit a relatively small amount of DL data with low latency. For example, the DL data may be transmitted in the DL common burst 420 of the UL centric subframe 410 in cases where waiting for the next DL centric subframe to transmit the DL data results in too much latency.

In the example in FIG. 8, the DL common burst 420 also includes DMRS for the DL data. The DMRS is used to assist one or more mobile stations 120 receiving the DL data to demodulate the DL data. The DMRS may be multiplexed with the DL data in the DL common burst 420 using frequency division multiplexing, time division multiplexing, etc. The DL common burst 420 may also include control information in the control region. The control region in the same DL common burst could be used to schedule the DL data and DMRS. For example, the control information indicates the channels on which the DL data and DMRS are transmitted in the DL common burst 420. Each of the channels may correspond to respective time and frequency resources in the DL common burst 420. The control information may also include the size of the DL data.

A mobile station 120 may receive the DL common burst 420 and decode the control information to determine the channels of the DL data and DMRS in the DL common burst 420 based on the control information. The mobile station 120 may then perform channel estimation using the DMRS and use the resulting channel estimation to demodulate the DL data. In some aspects, the DL data and DMTS may overlap in time. Thus, DL data and DMRS may be included in the DL common burst 420 for low latency data transmission.

In one example, the mobile station 120 may convert the received DL common burst 420 into digital samples (e.g., baseband samples) and store the samples in a buffer for further processing. In this example, the mobile station 120 may read samples from the buffer and process the samples to perform channel estimation using the DMRS. The mobile station 120 may then read samples from the buffer and process the samples to demodulate the DL data based on the channel estimation.

The mobile station 120 may also determine whether the DL data is successfully decoded at the mobile station (e.g., using an error-detecting code). ACK/NAK could be channelized in the UL common burst in the same subframe. The mobile station 120 may then transmit an ACK or NACK to the base station based on the determination. For example, the mobile station 120 may transmit an ACK if the DL data is successfully decoded and a NACK if the DL data is not successfully decoded. In response to a NACK, the base station may retransmit the DL data in a subsequent subframe. In the example in FIG. 8, the mobile station 120 transmits an ACK/NACK for the DL data in the UL common burst 435 of the same subframe in which the DL data is transmitted. In this regard, the control information in the DL common burst 420 may indicate the resources assigned to the mobile station 120 for the ACK/NACK. In another example, the resources used for transmitting the ACK/NACK information may be preconfigured, as discussed above. In another example, the mobile station 120 may transmit an ACK/NACK for the DL data in a subsequent subframe (e.g., in the UL common burst of the subsequent subframe). The mobile station 120 may also transmit UL data to the base station 110 in the UL data burst 430. In this example, the DL common burst 420 may include a UL grant indicating resources in the UL data burst 430 allocated to the mobile station 120 for UL transmission.

Figure 9:
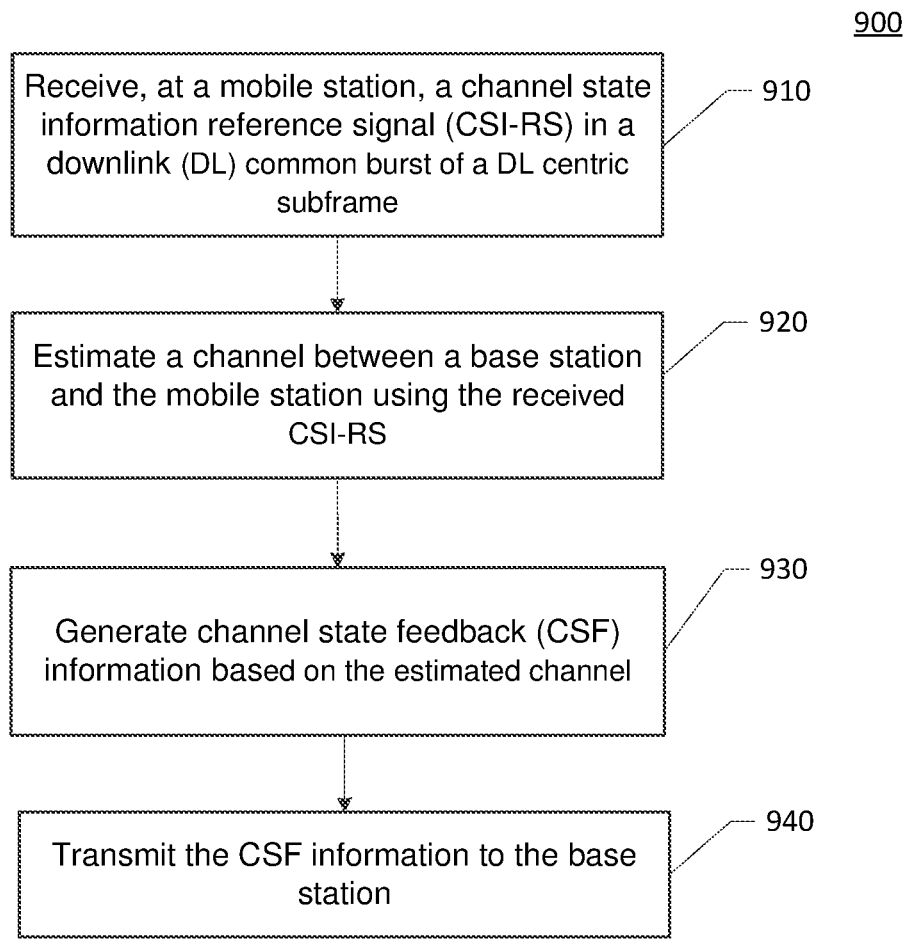
FIG. 9 is a block diagram illustrating a method for wireless communication according to an example.

FIG. 9 illustrates a method 900 for wireless communication according to an example. As shown in FIG. 9, the method includes, at block 910, receiving, at a mobile station, a channel state information reference signal (CSI-RS) in a downlink (DL) common burst of a DL centric subframe, at block 920, estimating a channel between a base station and the mobile station using the received CSI-RS, at block 930, generating channel state feedback (CSF) information based on the estimated channel, and, at block 940, transmitting the CSF information to the base station.

Figure 10:
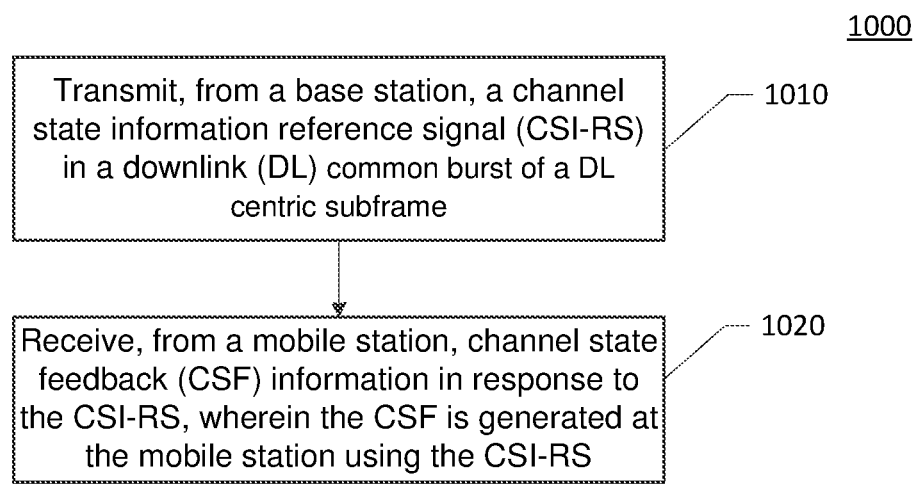
FIG. 10 is a block diagram illustrating a method for wireless communication according to another example.

FIG. 10 illustrates a method 1000 for wireless communication according to another example. The method includes, at block 1010 transmitting, at a base station, a channel state information reference signal (CSI-RS) in a downlink (DL) common burst of a DL centric subframe, and, at block 1020, receiving, from a mobile station, channel state feedback (CSF) information in response to the CS-RS, wherein the CSF is generated at the mobile station using the CSI-RS.

Figure 11:
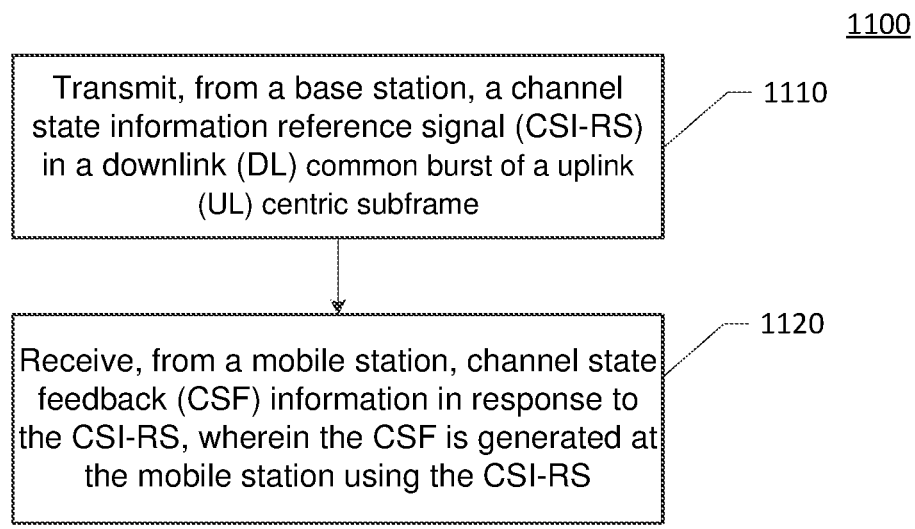
FIG. 11 is a block diagram illustrating a method for wireless communication according to yet another example.

FIG. 11 illustrates a method 1100 for wireless communication according to another example. The method includes, at block 1110, transmitting, at a base station, a channel state information reference signal (CSI-RS) in a downlink (DL) common burst of an uplink (UL) centric subframe, and receiving, from a mobile station, channel state feedback (CSF) information in response to the CS-RS, wherein the CSF is generated at the mobile station based on the CSI-RS.

Figure 12:
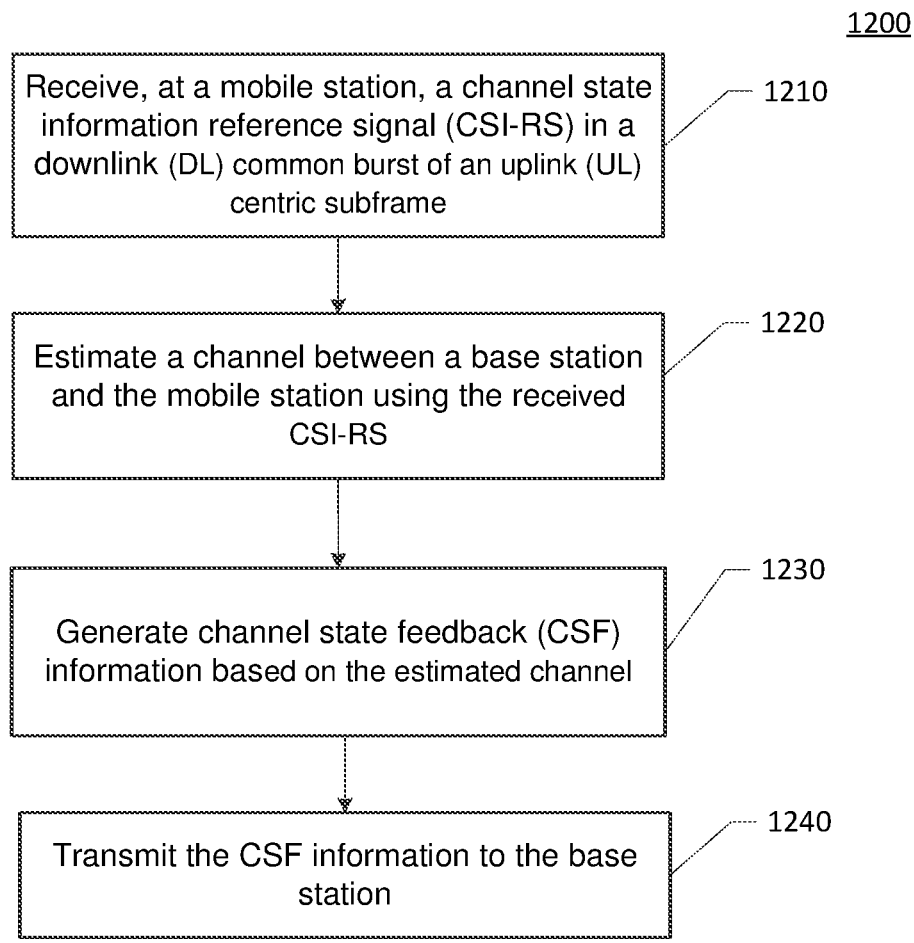
FIG. 12 is a block diagram illustrating a method for wireless communication according to still another example.

FIG. 12 illustrates a method 1200 for wireless communication according to another example. The method includes, at block 1210, receiving, at a mobile station, a channel state information reference signal (CSI-RS) in a downlink (DL) common burst of an uplink (UL) centric subframe, at block 1220, estimating a channel between a base station and the mobile station using the received CSI-RS, at block 1230, generating channel state feedback (CSF) information based on the estimated channel, and at block 1240, transmitting the CSF to the base station.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. An apparatus for wireless communication, comprising:
a memory; and
a processor operably coupled to the memory, wherein the processor is configured to:
receive, at a mobile station, a channel state information reference signal (CSI-RS) in a downlink (DL) common burst of an uplink (UL) centric subframe;
estimate a channel between a base station and the mobile station using the received CSI-RS;
generate channel state feedback (CSF) information based on the estimated channel; and
transmit the CSF to the base station in a UL data burst or a UL common burst within the subframe or a subsequent subframe.

2. The apparatus of claim 1, wherein the DL common burst comprises symbols that contain DL control information.

3. The method of claim 1, wherein the UL common burst comprises symbols that contain UL control information.

4. The method of claim 1, wherein the processor is configured to transmit uplink data (UL) in a UL data burst of the UL centric subframe, wherein the DL common burst and the UL data burst are separated by a gap to provide the base station and the mobile station time to transition from DL to UL.

5. The apparatus of claim 1, wherein the DL common burst includes a control region including one or more of the following: a UL grant, and resources in the UL data burst for transmitting UL data.

6. An apparatus for wireless communication, comprising:
a memory; and
a processor operably coupled to the memory, wherein the processor is configured to:
transmit, at a base station, a channel state information reference signal (CSI-RS) in a downlink (DL) common burst of an uplink (UL) centric subframe; and
receive, from a mobile station, channel state feedback (CSF) information in a UL data burst or a UL common burst within the subframe or a subsequent subframe in response to the CSI-RS, wherein the CSF is generated at the mobile station using the CSI-RS.

7. The apparatus of claim 6, wherein the DL common burst comprises symbols that contain DL control information.

8. The apparatus of claim 6, wherein the UL common burst comprises symbols that contain UL control information.

9. The apparatus of claim 6, further the processor is configured to receive uplink data (UL) in a UL data burst of the UL centric subframe, wherein the DL common burst and the UL data burst are separated by a gap to provide the base station and the mobile station time to transition from DL to UL.

10. The apparatus of claim 6, wherein the DL common burst includes a control region including one or more of the following: a UL grant, and resources in the UL data burst for transmitting UL data.

11. The apparatus of claim 6, wherein the processor is configured to:
receive a signal strength or signal quality measured at the mobile station using the M-RS.

12. The apparatus of claim 6, wherein the processor is configured to transmit, to the mobile station, a demodulation reference signal and DL data in the DL common burst of the subframe.

13. An apparatus for wireless communication, comprising:
a memory; and
a processor operably coupled to the memory, wherein the processor is configured to:
receive, at a mobile station, a channel state information reference signal (CSI-RS) in a downlink (DL) common burst of a DL centric subframe;
estimate a channel between a base station and the mobile station using the received CSI-RS;
generate channel state feedback (CSF) information based on the estimated channel; and
transmit the CSF information to the base station in an uplink (UL) common burst or a UL data burst within the subframe or a subsequent subframe.

14. The apparatus of claim 13, wherein the DL common burst comprises symbols that contain DL control information.

15. The apparatus of claim 13, wherein the UL common burst and a DL data burst of the subframe are separated by a gap to provide the base station and the mobile station time to transition from DL to UL.

16. The apparatus of claim 13, wherein the DL common burst includes a control region including one or more of the following: a DL grant, resources in the DL data burst for receiving DL data, and a demodulation reference signal.

17. The apparatus of claim 13, wherein the processor is further configured to:
receive a measurement reference signal (M-RS) in the DL common burst of the subframe; and
measure signal strength or signal quality using the received M-RS.

18. The apparatus of claim 13, wherein the processor is configured to:
receive, at the mobile station, DL data in a DL data burst of the subframe;
determine whether the received DL is successfully decoded at the mobile station;
generate an ACK/NACK based on the determination; and
transmit the ACK/NACK in an uplink (UL) common burst of the subframe or a subsequent subframe.

19. The apparatus of claim 13, wherein the channel state information reference signal (CSI-RS) may also be received in a downlink (DL) common burst of an uplink (UL) centric subframe.

20. An apparatus for wireless communication, comprising:
a memory; and
a processor operably coupled to the memory, wherein the processor is configured to:
transmit, at a base station, a channel state information reference signal (CSI-RS) in a downlink (DL) common burst of a DL centric subframe; and
receive, from a mobile station, channel state feedback (CSF) information in an uplink (UL) common burst or a UL data burst within the subframe or a subsequent subframe in response to the CSI-RS, wherein the CSF is generated at the mobile station using the CSI-RS.

21. The apparatus of claim 20, wherein the DL common burst comprises symbols that contain DL control information.

22. The apparatus of claim 20, wherein the UL common burst and a DL data burst of the subframe are separated by a gap to provide the base station and the mobile station time to transition from DL to UL.

23. The apparatus of claim 20, wherein the DL common burst includes a control region including one or more of the following: a DL grant, resources in the DL data burst for receiving DL data, and a demodulation reference signal.

24. The apparatus of claim 20, wherein the channel state information reference signal (CSI-RS) may also be transmitted in a downlink (DL) common burst of an uplink (UL) centric subframe.

25. A method for wireless communication, comprising:
receiving, at a mobile station, a channel state information reference signal (CSI-RS) in a downlink (DL) common burst of a DL centric subframe;
estimating a channel between a base station and the mobile station using the received CSI-RS;
generating channel state feedback (CSF) information based on the estimated channel; and
transmitting the CSF information to the base station in an uplink (UL) common burst or a UL data burst within the subframe or a subsequent subframe.

26. The method of claim 25, wherein the DL common burst comprises symbols that contain DL control information.

27. The method of claim 25, wherein the UL common burst and a DL data burst of the subframe are separated by a gap to provide the base station and the mobile station time to transition from DL to UL.

28. The method of claim 25, wherein the DL common burst includes a control region including one or more of the following: a DL grant, resources in the DL data burst for receiving DL data, and a demodulation reference signal.

29. The method of claim 25, further comprising:
receiving a measurement reference signal (M-RS) in the DL common burst of the subframe; and
measuring signal strength or signal quality using the received M-RS.

30. The method of claim 29, further comprising determining whether to trigger a handover event for the mobile station based on the measured signal strength or signal quality.

31. The method of claim 25, further comprising:
receiving, at the mobile station, DL data in a DL data burst of the subframe;

determining whether the received DL is successfully decoded at the mobile station;
generating an ACK/NACK based on the determination; and
transmitting the ACK/NACK.

32. The method of claim 31, wherein transmitting the ACK/NACK comprises transmitting the ACK/NACK in an uplink (UL) common burst of the subframe.

33. An apparatus for wireless communication, comprising:
means for receiving, at a mobile station, a channel state information reference signal (CSI-RS) in a downlink (DL) common burst of a DL centric subframe;
means for estimating a channel between a base station and the mobile station using the received CSI-RS;
means for generating channel state feedback (CSF) information based on the estimated channel; and
means for transmitting the CSF information to the base station in an uplink (UL) common burst or a UL data burst of the subframe or a subsequent subframe.

34. A non-transitory computer-readable storage medium comprising code that, when executed by a computer, causes the computer to:
receive, at a mobile station, a channel state information reference signal (CSI-RS) in a downlink (DL) common burst of a DL centric subframe;
estimate a channel between a base station and the mobile station using the received CSI-RS;
generate channel state feedback (CSF) information based on the estimated channel; and
transmit the CSF information to the base station in an uplink (UL) common burst or a UL data burst of the subframe or a subsequent subframe.

35. A method for wireless communication, comprising:
transmitting, at a base station, a channel state information reference signal (CSI-RS) in a downlink (DL) common burst of a DL centric subframe; and
receiving, from a mobile station, channel state feedback (CSF) information in response to the CSI-RS, wherein the CSF is generated at the mobile station using the CSI-RS, wherein receiving the CSF information comprises receiving the CSF information at the base station in an uplink (UL) common burst or a UL data burst within the subframe or a subsequent subframe.

36. The method of claim 35, wherein the DL common burst comprises symbols that contain DL control information.

37. The method of claim 35, wherein the UL common burst and a DL data burst of the subframe are separated by a gap to provide the base station and the mobile station time to transition from DL to UL.

38. The method of claim 35, wherein the DL common burst includes a control region including one or more of the following: a DL grant, resources in the DL data burst for receiving DL data, and a demodulation reference signal.

39. The method of claim 35, further comprising:
transmitting, to the mobile station, a measurement reference signal (M-RS) in the DL common burst of the subframe; and
receiving a signal strength or signal quality measured at the mobile station using the M-RS.

40. The method of claim 35, further comprising:
transmitting, to the mobile station, DL data in a DL data burst of the subframe; and
receiving an ACK/NACK indicating whether the DL data was successfully decoded at the mobile station.

41. The method of claim 40, wherein receiving the ACK/NACK comprises receiving the ACK/NACK in an uplink (UL) common burst of the subframe.

42. An apparatus for wireless communication, comprising:
means for transmitting, at a base station, a channel state information reference signal (CSI-RS) in a downlink (DL) common burst of a DL centric subframe; and
means for receiving, from a mobile station, channel state feedback (CSF) information in an uplink (UL) common burst or a UL data burst of the subframe or a subsequent subframe in response to the CSI-RS, wherein the CSF is generated at the mobile station using the CSI-RS.

43. A non-transitory computer-readable storage medium comprising code that, when executed by a computer, causes the computer to:
transmit, at a base station, a channel state information reference signal (CSI-RS) in a downlink (DL) common burst of a DL centric subframe; and
receive, from a mobile station, channel state feedback (CSF) information in an uplink (UL) common burst or a UL data burst of the subframe or a subsequent subframe in response to the CSI-RS, wherein the CSF is generated at the mobile station using the CSI-RS.

44. A method for wireless communication, comprising:
transmitting, at a base station, a channel state information reference signal (CSI-RS) in a downlink (DL) common burst of an uplink (UL) centric subframe; and
receiving, from a mobile station, channel state feedback (CSF) information in a UL data burst or a UL common burst of the subframe or a subsequent subframe in response to the CSI-RS, wherein the CSF is generated at the mobile station based on the CSI-RS.

45. The method of claim 44, wherein the DL common burst comprises symbols that contain DL control information.

46. The method of claim 44, wherein the UL common burst comprises symbols that contain UL control information.

47. The method of claim 44, further comprising receiving uplink data (UL) in a UL data burst of the UL centric subframe, wherein the DL common burst and the UL data burst are separated by a gap to provide the base station and the mobile station time to transition from DL to UL.

48. The method of claim 44, wherein the DL common burst includes a control region including one or more of the following: a UL grant, and resources in the UL data burst for transmitting UL data.

49. The method of claim 44, further comprising:
transmitting a measurement reference signal (M-RS) in the DL common burst of the subframe; and
receiving a signal strength or signal quality measured at the mobile station using the M-RS.

50. The method of claim 44, further comprising transmitting, to the mobile station, a demodulation reference signal and DL data in the DL common burst of the subframe.

51. The method of claim 50, further comprising receiving an ACK/NACK indicating whether the DL data was successfully decoded at the mobile station.

52. The method of claim 51, wherein receiving the ACK/NACK comprises receiving the ACK/NACK in a UL data burst or a UL common burst of the subframe.

53. The method of claim 44, wherein the channel state information reference signal (CSI-RS) may also be transmitted in a downlink (DL) common burst of a downlink (DL) centric subframe.

54. An apparatus for wireless communication, comprising:
   means for transmitting, at a base station, a channel state information reference signal (CSI-RS) in a downlink (DL) common burst of an uplink (UL) centric subframe; and
   means for receiving, from a mobile station, channel state feedback (CSF) information in a UL data burst or a UL common burst of the subframe or a subsequent subframe in response to the CSI-RS, wherein the CSF is generated at the mobile station using the CSI-RS.

55. A non-transitory computer-readable storage medium comprising code that, when executed by a computer, causes the computer to:
   transmit, at a base station, a channel state information reference signal (CSI-RS) in a downlink (DL) common burst of an uplink (UL) centric subframe;
   receive, from a mobile station, channel state feedback (CSF) information in a UL data burst or a UL common burst of the subframe or a subsequent subframe in response to the CSI-RS, wherein the CSF is generated at the mobile station using the CSI-RS.

56. A method for wireless communication, comprising:
   receiving, at a mobile station, a channel state information reference signal (CSI-RS) in a downlink (DL) common burst of an uplink (UL) centric subframe;
   estimating a channel between a base station and the mobile station using the received CSI-RS;
   generating channel state feedback (CSF) information based on the estimated channel; and
   transmitting the CSF to the base station in a UL data burst or a UL common burst of the subframe or a subsequent subframe.

57. The method of claim 56, wherein the DL common burst comprises symbols that contain DL control information.

58. The method of claim 56, wherein the UL common burst comprises symbols that contain UL control information.

59. The method of claim 56, further comprising transmitting uplink data (UL) in a UL data burst of the UL centric subframe, wherein the DL common burst and the UL data burst are separated by a gap to provide the base station and the mobile station time to transition from DL to UL.

60. The method of claim 56, wherein the DL common burst includes a control region including one or more of the following: a UL grant, and resources in the UL data burst for transmitting UL data.

61. The method of claim 56, further comprising:
   receiving a measurement reference signal (M-RS) in the DL common burst of the subframe; and
   measuring signal strength or signal quality using the received M-RS.

62. The method of claim 61, further comprising determining whether to trigger a handover event for the mobile station based on the measured signal strength or signal quality.

63. The method of claim 56, further comprising:
   receiving, at the mobile station, a demodulation reference signal and DL data in the DL common burst of the subframe; and
   demodulating the DL data using the demodulation reference signal.

64. The method of claim 63, further comprising:
   determining whether the received DL is successfully decoded at the mobile station;
   generating an ACK/NACK based on the determination; and
   transmitting the ACK/NACK.

65. The method of claim 64, wherein transmitting the ACK/NACK comprises transmitting the ACK/NACK in a UL data burst or a UL common burst of the subframe.

66. The method of claim 56, wherein the channel state information reference signal (CSI-RS) may also be received in a downlink (DL) common burst of a downlink (DL) centric subframe.

67. An apparatus for wireless communication, comprising:
   means for receiving, at a mobile station, a channel state information reference signal (CSI-RS) in a downlink (DL) common burst of an uplink (UL) centric subframe;
   means for estimating a channel between a base station and the mobile station using the received CSI-RS;
   means for generating channel state feedback (CSF) information based on the estimated channel; and
   means for transmitting the CSF to the base station in a UL data burst or a UL common burst of the subframe or a subsequent subframe.

68. A non-transitory computer-readable storage medium comprising code that, when executed by a computer, causes the computer to:
   receive, at a mobile station, a channel state information reference signal (CSI-RS) in a downlink (DL) common burst of an uplink (UL) centric subframe;
   estimate a channel between a base station and the mobile station using the received CSI-RS;
   generate channel state feedback (CSF) information based on the estimated channel; and
   transmit the CSF to the base station in a UL data burst or a UL common burst of the subframe or a subsequent subframe.

* * * * *